(12) United States Patent
Jaschinski

(10) Patent No.: US 6,409,881 B1
(45) Date of Patent: Jun. 25, 2002

(54) METAL-CROSSLINKABLE OXIDIZED CELLULOSE-CONTAINING FIBROUS MATERIALS AND PRODUCTS MADE THEREFROM

(75) Inventor: Thomas Jaschinski, Mannheim (DE)

(73) Assignee: SCA Hygiene Products GmbH, Mannheim (DE)

(*) Notice: Subject to any disclaimer, the term of this patent is extended or adjusted under 35 U.S.C. 154(b) by 0 days.

(21) Appl. No.: 09/706,764

(22) Filed: Nov. 7, 2000

(30) Foreign Application Priority Data

Nov. 8, 1999 (DE) ........................... 199 53 591

(51) Int. Cl.[7] ............................. D21H 11/20
(52) U.S. Cl. .................... 162/9; 162/100; 162/141; 162/157.6; 162/181.1; 162/181.2; 162/181.4; 162/181.5; 162/182; 8/116.1
(58) Field of Search ................... 162/9, 100, 141, 162/157.6, 181.1, 181.2, 181.4, 181.5, 182; 8/116.1

(56) References Cited

U.S. PATENT DOCUMENTS

| | | |
|---|---|---|
| 3,086,969 A | 4/1963 | Slager |
| 3,137,588 A | 6/1964 | Taylor |
| 3,313,641 A | 4/1967 | Borchert |
| 3,431,254 A | 3/1969 | Klug |
| 4,100,341 A | 7/1978 | Brasey et al. |
| 4,647,505 A | 3/1987 | Blackie et al. |
| 4,972,018 A | 11/1990 | Leadbetter |
| 5,334,756 A | 8/1994 | Likibi et al. |
| 5,348,621 A | 9/1994 | Rudy |
| 5,416,215 A | 5/1995 | Buschken et al. |
| 5,447,603 A * 9/1995 | Michalowski et al. ... 162/181.4 |
| 5,472,485 A | 12/1995 | Pandian et al. |
| 5,629,426 A | 5/1997 | Pastor et al. |
| 5,667,637 A * 9/1997 | Jewell et al. ............ 162/157.6 |
| 5,725,601 A * 3/1998 | Tajiri et al. .................. 162/182 |
| 5,739,352 A | 4/1998 | Barner et al. |
| 5,770,711 A * 6/1998 | Greene et al. ........... 162/157.6 |
| 5,821,374 A | 10/1998 | Jenny et al. |
| 5,849,929 A | 12/1998 | Volodarsky et al. |
| 5,873,979 A | 2/1999 | Naieni |
| 5,877,330 A | 3/1999 | Kishimoto et al. |
| 5,935,383 A * 8/1999 | Sun et al. ................... 162/182 |
| 6,103,059 A | 8/2000 | Call |
| 6,228,217 B1 * 5/2001 | Dickerson et al. ....... 162/181.1 |
| 6,319,361 B1 * 11/2001 | Smith et al. ................... 162/9 |

FOREIGN PATENT DOCUMENTS

| | | |
|---|---|---|
| DE | 4432795 A1 | 3/1996 |
| DE | 19821263 A1 | 11/1998 |
| DE | 19723912 A1 | 12/1998 |
| DE | 19746805 C1 | 4/1999 |
| EP | 0283951 A1 | 9/1988 |
| EP | 0324382 A2 | 7/1989 |
| EP | 0574666 A1 | 12/1993 |
| EP | 0752024 B1 | 1/1997 |
| GB | 1299646 | 12/1972 |
| GB | 1385894 | 3/1975 |
| GB | 2289695 A | 11/1995 |
| JP | 63211399 | 9/1988 |
| JP | 299695 | 4/1990 |
| JP | 617399 | 1/1994 |
| JP | 8003136 | 1/1996 |
| JP | 10072501 A | 3/1998 |
| JP | 10251302 | 9/1998 |
| JP | 1112301 | 1/1999 |
| SE | 510528 | 5/1999 |
| SU | 592905 | 2/1978 |
| SU | 1268648 A1 | 7/1986 |
| SU | 1268649 A1 | 7/1986 |
| WO | WO 94 16750 | 8/1994 |
| WO | WO 94 29510 | 12/1994 |
| WO | WO 95 07303 | 3/1995 |
| WO | WO 95 11340 | 4/1995 |
| WO | WO 95 25844 | 9/1995 |
| WO | WO 96 36621 | 11/1996 |
| WO | WO 96 38484 | 12/1996 |
| WO | WO 97 36037 | 10/1997 |
| WO | WO 97 36051 | 10/1997 |
| WO | WO 97 36052 | 10/1997 |
| WO | WO 97 36053 | 10/1997 |
| WO | WO 97 36054 | 10/1997 |
| WO | WO 98 27117 | 6/1998 |
| WO | WO 99 23117 | 5/1999 |
| WO | WO 99 23240 | 5/1999 |
| WO | WO 00 50462 A | 8/2000 |
| WO | 01/29309 A1 | 4/2001 |

OTHER PUBLICATIONS

Database WPI, Section Ch, Week 198726, Derwent Publications Ltd., London, GB, Class A97, AN 1987 183691, XP002159123 & SU 1 268 650 A, Nov. 7, 1986.

Kitaoka, T. et al. "Chemical Modification of Pulp Fibers By Tempo–Mediated Oxidation." Nordic Pulp and Research Journal, SE Stockholm, vol. 14, No. 4, 1999, pp. 29–284.

A.E.J. De Nooy, "Selective oxidation of primary alcohol groups in polysaccharides," 1997, pp. 1–104.

T. Miyazawa et al., "Selective Oxidation of Alcohols by Oxoaminium Salts," J. Org. Chem., 1985, vol. 50, No. 8, pp. 1332–1334.

I. McAlpine, Das Papier, Heft 7, 1986, "Die Rolle von Ammonium–zirkoniumkarbonat fur Papier und Pappebeschichtungen," pp. 2–7, (contains English abstract).

(List continued on next page.)

*Primary Examiner*—Peter Chin
(74) *Attorney, Agent, or Firm*—Young & Thompson

(57) ABSTRACT

The present invention relates to crosslinked cellulose-containing fibrous material, wherein hydroxy groups are oxidized at the C(6) of glucose units of the cellulose into aldehyde and/or carboxy groups crosslinked with a metal-containing crosslinking agent selected from transition metals of groups of IVa (preferably Zr), Va, VIa, VIIa and VIIIa, aluminum and zinc; and a paper or nonwoven (product), e.g. tissue (product), which comprises this fibrous material. These paper or nonwoven (products) are distinguished by high wet and dry strength.

25 Claims, No Drawings

OTHER PUBLICATIONS

C. Chirat et al., "Heat- and Light–Induced Brightness Reversion of Bleached Chemical Pulps," Journal of Pulp and Paper Science, vol. 25, No. 6, 1999, pp. 201–205.

N.J. Davis et al., "Selective Oxidation of Monosaccharide Derivatives to Uronic Acids," Tetrahedron Letters, vol. 34, No. 7, pp. 1181–1184, 1993.

P.S. Chang et al., "Oxidation of Primary Alcohol Groups of Naturally Occurring Polysaccharides with 2,2,6,6–Tetramethyl–1–Piperdine Oxoammonium Ion," 15(7), 1996, pp. 819–830.

A. Isogai et al., "Preparation of polyuronic acid from cellulose by TEMPO–mediated oxidation," Cellulose, 1998, 5, pp. 153–164.

S.H. Zeronian et al., "The Mechanical Properties of Paper Made from Periodate Oxycellulose Pulp and from the Same Pulp after Reduction with Borohydride," TAPPI, vol. 47, No. 9, 1964, pp. 557–564.

B. Alince, "Development of paper tensile strength by periodate oxidation," Svensk Papperstidning, No. 7, 1995, pp. 253–257.

P.J. Borchert et al., "Cationic Dispersions of Dialdehyde Starch," TAPPI, Sep. 1964, vol. 47, No. 9, pp. 525–528.

E.S. Putnam, "The Exchange Reaction Between Calcium and Carboxyl Groups in Cellulose," TAPPI, Sep. 1964, vol. 47, No. 9, pp. 549–554.

J. Mirza et al., "Cationic Dispersion of Dialdehyde Starch," TAPPI, Sep. 1964, vol. 47, No. 9, pp. 583–586.

M.L. Wolfrom et al., "Alkaline Hypochlorite Oxidation of Cellulose Analogs," TAPPI, Apr. 1964, vol. 47, No. 4, pp. 189–192.

N.S. Thompson et al., "Some Chemical and Physical Properties of Pulps Prepared by Mild Oxidative Action," TAPPI, Mar. 1964, vol. 47, No. 3, pp. 157–162.

TAPPI, 1964, vol. 47, No. 4, pp. 100A and 104A and 107A, 1964 Pulp Bleaching Conference, O. Theander, "Carbonyl Glucosides, Formation And Properties," K.V. Sarkanen et al., "Kinetics of Hypochlorite Oxidation of Cellulose and Cellulose Models in the pH Range of 5 to 10".

G. Broughton et al., "The Mechanical Properties of Paper—Part II," TAPPI, vol. 37, No. 2, 1954, pp. 72–78.

R.A. Plunkett, "Estimation of Depolymerization in Dialdehyde Starch Dispersions," TAPPI, vol. 51, No. 4, 1968, pp. 152–155.

J.W. Daniel, "The Hypothesized Carbonic Acid Ester Linkages in Cellulose Oxidized by Aqueous Chlorine at pH 4.5," TAPPI, vol. 42, No. 7, 1959, pp. 534–544.

C.R. Pottenger, "The Mechanism of Cerium (IV) Oxidation of Glucose and Cellulose," TAPPI, vol. 51, No. 11, 1968, pp. 544.

E. Sjöström et al., "The Influence of Carboxyl and Carbonyl Groups on the Brightness Stability of Bleached Pulps," TAPPI, vol. 51, No. 1, 1968, pp. 16–19.

L.E. Wise, "Chemically Modified Cellulose," Wood Chemistry, Reinhold Publishing Corp., 1946, Chapter 6, pp. 141–152.

L. Wagberg et al., "Physicochemical characterization of papermaking fibres," Transactions of the $11^{th}$ Fundamental Research Symposium held at Cambridge, Sep. 1997, pp. 43–55.

S. Katz et al., "The determination of strong and weak acidic groups in sulfite pulps," Svensk Papperstidning, No. 6, 1998, pp. R48–R53.

L. Wagberg et al., "Charge determination of porous substrates by polyelectrolyte adsorption," Nordic Pulp and Paper Research Journal, No. 2, 1989, pp. 71–76.

D. Horten et al., "Preparation of Unsubstituted 6–Aldehydocelluloses by Photolysis of 6–Azido–6–Deoxycelluloses," Carbohydrate Research 26 (1973), pp. 1–19.

J. Hamuro, Chemical Abstracts, vol. 83, No. 20, 1975, Abstract No. 166084 and JP–A–50/054684, Ajinomoto Co., "Polyaldehydes".

M. Pagliaro, "Autocatalytic oxidations of primary hydroxyl groups of cellulose in phosphoric acid with halogen oxides," Carbohydrate Research 308 (1998), pp. 311–317.

Raymond A. Young, "Bonding of Oxidized Cellulose Fibers and Interaction with Wet Strength Agents," *Wood and Fiber*, V. 10, 1978, pp. 112–119.

Philip Luner et al. "The Effect of Chemical Modification on the Mechanical Properties of Paper," *Tappi*, V. 50, 1967, pp. 37–39.

* cited by examiner

METAL-CROSSLINKABLE OXIDIZED CELLULOSE-CONTAINING FIBROUS MATERIALS AND PRODUCTS MADE THEREFROM

The present invention relates to metal-crosslinkable oxidized cellulose-containing fibrous materials and products obtainable therefrom. These particularly include planar products such as papers or nonwovens. A particularly preferred aspect of the invention relates to tissue papers and tissue products made of such cellulose-containing fibrous materials characterized by advantageous properties, particularly regarding their strength and behavior with respect to moisture that acts from outside. The invention also makes available a method of producing the crosslinkable oxidized fibrous materials and the products derived therefrom.

Planar products which include cellulose-containing fibrous materials according to the invention or which are made therefrom may be present in various forms and are also designated in correspondingly varied ways: for example, the German term "Vlies" (=mat or nonwoven) is used in different ways in German-speaking countries (cf. in this respect: Handbuch der Papier- und Pappenfabrikation (Papierlexikon), second edition, Vol. II, 1971, p. 1997: ISBN 3 500 16 000 X). In the technical language employed by paper makers, the above term is used for the moist fibrous mat which is formed from an aqueous fibrous-material suspension during sheet making upon simultaneous drainage on a screen or between two revolving endless screens. This is then referred to as a moist fibrous mat, the initially formed moist sheet or in the case of an industrial paper machine, as the initially formed, still moist paper web. In the case of higher dry contents, the terms sheet, paper sheet or web and/or paper web are more common.

The German terms "Vlies" and "Vliesstoffe" are also applied to a wide range of products which in terms of their properties are located between the groups of paper, cardboard, board on the one hand and the textile products on the other and are nowadays summarized under the term "nonwovens" (see ISO 9092-EN 29092). As regards the production of nonwovens, a large number of extremely varied production processes is used, such as the so-called air-laid and spun-laid techniques, as well as so-called wet-laid techniques, the former as a typical choice from the so-called dry-laid techniques predominating by far and the wet-laid techniques similar to paper manufacturing forming more a marginal group.

Today, nonwovens are understood as an independent group of products. Nonwovens include mats, nonwoven fabrics and finished products made therefrom, in many cases for hygiene requirements. These composite materials, which frequently resemble textiles, represent flexible porous fabrics that are not produced by the classic methods of weaving warp and weft or by looping, but by intertwining and/or by cohesive and/or adhesive bonding of typical synthetic textile fibers which may for example be present in the form of endless threads or threads prefabricated with an endless length, as synthetic threads produced in situ or in the form of staple fibers. Alternatively, they may be made of blends of synthetic fibers in the form of staple fibers and natural fibers, e.g. natural vegetable fibers (see DIN 61 210 T2 of October 1988 and ISO 9092-EN 29092).

"Papers" are also planar materials, albeit essentially composed of fibers of a vegetable origin and formed by drainage of a fibrous-material suspension on a screen or between two endless revolving screens and by subsequent compression and drainage or drying of the thus produced mat (cf. DIN 6730, May 1996). The standard restricts the range of mass per unit area (basis weight) for paper to less than/equal to 225 $g/m^2$.

In German standard DIN 6730, the German term "Karton" (=cardboard) has a definition similar to paper, though the basis weight range extends from 150 $g/m^2$ to 600 $g/m^2$, i.e. there is an overlap here with respect to paper. The term Karton is common only in German-speaking countries.

The German term "Pappe" (=(paper)board) is defined in DIN 6730 as a generic term for solid board and corrugated fiber board and encompasses products in the basis weight range above 225 $g/m^2$.

Based on the underlying compatibility of the production processes (wet laying), "tissue" production is counted among the paper making techniques. The production of tissue, or more accurately, raw tissue if the one-ply (intermediate) product manufactured on a special-purpose paper machine of the tissue or tissue paper machine is meant, is delimited from paper production as a result of the extremely low basis weight of normally less than 65, more often less than 40 $g/m^2$ and as a result of the much higher tensile energy absorption index. The tensile energy absorption index is arrived at from the tensile energy absorption in which the tensile energy absorption is related to the test sample volume before inspection (length, width, thickness of sample between the clamps before tensile load). Paper and tissue paper also differ in general, as do tissue papers which differ from the raw material, chemical additives and production conditions with regard to the modulus of elasticity that characterizes the stress-strain properties of these planar products as a material parameter.

A tissue's high tensile energy absorption index results from the outer or "inner" creping. The former is produced by compression of the paper web adhering to a drying cylinder as a result of the action of a crepe doctor or in the latter instance as a result of a difference in speed between two wires ("fabrics"). In the latter technique, often referred to as "(wet) rush transfer", for instance the forming fabric of the paper machine is moved at greater speed than the fabric the formed paper web is transferred to, for instance a transfer fabric or a TAD fabric (through air drying), so that the paper web is bundled somewhat when it is taken up by the transfer fabric. This causes the still moist, plastically deformable paper web to be internally broken up by compression and shearing, thereby rendering it more stretchable under load than paper, which has not been subjected to outer or inner creping. Many prior art documents (e.g. EP-A-0 617 164, WO-94/28244, U.S. Pat. No. 5,607,551, EP-A-0 677 612, WO-96/09435) mean this "inner creping", if they describe the production of "uncreped" tissue paper by rush transfer techniques.

Most of the functional properties typical of tissue and tissue products result from the high tensile energy absorption (see DIN EN 12625-4 and DIN EN 12625-5).

An example of papers and paper products is represented by hygiene papers, particularly tissue papers and hygiene products (tissue products) made therefrom and which are e.g. used in personal grooming and hygiene, the household sector, industry, the institutional field in a wide variety of cleaning processes. They are used to absorb fluids, for decorative purposes, for packaging or even as supporting material, as is common for example in medical practices or in hospitals. In terms of their wide variety, hygiene products are now considered to be everyday products.

Hygiene paper primarily includes all kinds of dry-creped tissue paper, as well as wet-creped paper and cellulose or pulp wadding.

The one-ply intermediate products originating from the paper machine and made of lightweight paper usually dry-creped on a yankee cylinder by means of a crepe doctor are generally described as "tissue paper" or more accurately raw tissue paper. The one-ply raw tissue may be built up of one or a plurality of layers respectively.

All one-ply or multi-ply final products made of raw tissue and tailored to the end user's needs, i.e. fabricated with a wide variety of requirements in mind, are known as "tissue products".

Typical properties of tissue paper include the ready ability to absorb tensile stress energy, their drapability, good textile-like flexibility, properties which are frequently referred to as bulk softness, a high surface softness, a high specific volume with a perceptible thickness, as high a liquid absorbency as possible and, depending on the application, a suitable wet and dry strength as well as an interesting visual appearance of the outer product surface. These properties allow tissue paper to be used for example as cleaning wipes, sanitary products (e.g. toilet paper), paper handkerchiefs, cosmetic wipes (facials) or as serviettes/napkins.

The invention's range of applications nevertheless also includes those materials or products which are known as "fluff" products in specialist circles, such as absorptive material for diapers/nappies, articles of feminine hygiene including sanitary napkins/towels, tampons, slips or incontinence articles for adults, and the like.

Papers and paper products are often exposed to extremely varied strength requirements in the wet and dry states. For instance, it must be ensured in the case of packaging paper that it also retains its strength at least for a specific period of time when exposed to rainwater. On the other hand, toilet paper should dissolve in water—some time after use—in order to prevent the sewage systems from clogging up. At the same time, toilet paper must not immediately lose its strength properties during use, i.e. whenever it has just briefly come into contact with the moisture from excrement.

A general summary of the production of fibrous material and paper is found in Ullmann's Encyclopedia of Industrial Chemistry, published by VCH Verlagsgesellschaft mbH, Weinheim, 1991 (5th edition), Vol. A18, "Paper and Pulp", pp. 545 to 691.

To describe the strength properties of paper, the prior art therefore often draws a distinction between a paper's "dry strength", "initial wet strength", "temporary" and "permanent" wet strength. This also applies to tissue paper and tissue products.

Dry strength is generally determined in a similar manner, in the case of paper usually based on DIN EN ISO 1924-2, Paper and Board, Determination of properties under tensile load. Part 2: method at a constant rate of elongation, April 1995, (ISO 1924-2:1994). In the case of tissue paper and tissue products, tests are performed on the basis of DIN EN 12625 -4, Tissue Paper and Tissue Products-Part 4: determination of width-related breaking strength, elongation at break and the tensile energy absorption, January 1999.

The term "initial wet strength" was originally used just to characterize pulps for paper production such as groundwood pulp, but was later extended to chemical pulp. The initial wet strength is calculated on a 100 g/m² test strip produced on the Rapid Kothen device in accordance with German Zellcheming Code of Practice VI/6.

Similarly, the initial wet tensile strength index, initial wet tensile stretch behavior and initial wet-strength energy absorption index of a wet-pressed laboratory sheet are calculated in accordance with SCAN M 11 and SCAN M 12, with the difference that in these instances, the test strips of the obtained laboratory sheets are tested according to the normal methods of strength testing by means of an electronic tensile testing machine, without needing special-purpose testing equipment (see Werner Franke (editor), Prüfung von Papier, Pappe, Zellstoff und Holzstoff, Vol. 3, Physikalisch-technologische Prüfung der Papierfaserstoffe, pp. 86-87, Springer-Verlag, ISBN 3-540-55896-9).

The initial wet strength originally characterized the strength after sheet formation, and particularly refers to the strength of the initially formed moist paper web at the time of the first free transfer e.g. from the screen-section to a subsequent press section.

More recent prior art defines initial wet strength more broadly than earlier prior art. This definition essentially acts as a parameter for characterizing the strength behavior of remoistened paper, paper products, tissue paper and tissue products. It is ascertained as the tensile strength of paper soaked over a specific period of time.

In this way, WO 97/36052 and U.S. Pat. No. 5,760,212 do indeed define the initial wet strength by means of the normal wet strength determination employed in comparable measuring techniques. Yet the so-called initial wet strength here corresponds to the wet strength of a sample (test strip) from a test sheet exhibiting a predetermined basis weight and produced under standardized conditions, calculated—after previously soaking the test strip—using a standardized tensile testing device under standardized test conditions.

In addition to the initial wet strength, the aforementioned documents introduce and use the terms "temporary" and "permanent" wet strength as further criteria for evaluating the strength of a product after it has been remoistened (wet strength) and hence as criteria for its suitability in everyday practice (for example the dissolving properties of toilet paper after it has been used in order to avoid clogging up the pipes). The soaking duration and decrease in wet strength over time are used in these documents as criteria to differentiate between initial, temporary and permanent wet strength.

In these documents, a rate of decrease is mathematically determined on the basis of measured values as a criterion for the evaluation of temporary wet strength in that the difference is formed from the so-called initial wet strength as the wet strength after 5 s soaking duration and the wet strength after 30 min soaking duration for samples that were somehow pretreated e.g. by addition of a wet-strength agent or by modification of the fibrous material in order to increase wet strength. The difference of the corresponding measurements for untreated samples is calculated in a similar way. The difference of the strengths of the treated samples is then placed in proportion to the difference of the strengths of the untreated samples and expressed as a percentage.

In simplified terms, this means that temporary wet strength should be defined as the drop in strength of a sheet of paper or tissue paper or of a tissue product; after remoistening the paper, tissue paper or tissue product after expiry of an interval of the action of moisture (soaking) to be specified by definition, this drop can be determined in terms of measurement technology by means of a standard test method. In contrast, the permanent wet strength should be defined as the maintenance of strength even after moisture has exerted its influence for a fairly long time upon remoistening e.g. for a period of 30 min.

The same applies to nonwovens and products made thereof.

When experimentally checking the present invention, a similar approach was adopted in principle, though existing national, European or international standards were as far as possible fallen back on in the calculation and description of the results, and the comparisons between treated and untreated samples were made only on the basis of a (wet) tensile strength also designated as initial wet strength.

Additional definitions for suitable parameters, e.g. a broader definition of initial wet strength, are derived from the above in order to describe the results regarding an increase in (wet) strength exhibited by the materials, products, intermediate products and modified fibrous raw materials according to the invention (obtained e.g. by using the methods according to the invention); these definitions will be described below either in their relation to the adopted test methods or they will be included by reference to corresponding standards. The corresponding approach appears under the section "Test methods" before the examples of the present invention.

A paper of an untreated cellulose-containing fibrous material usually loses 95% to 97% of its dry strength when saturated with water, so that it normally cannot be used in the moistened or wet states. This is due to the fact that the paper and/or paper products to an extent develop a dry strength as a result of inter-fiber hydrogen bonds. If the paper is moistened, the water breaks up the hydrogen bonds and therefore reduces the strength of the paper.

There are two important techniques for increasing the wet strength of paper that have already been in use for some time. One technique prevents the water from reaching and breaking up the hydrogen bonds, e.g. by applying a water-repellent material to the fibers. The second approach is to provide the paper with additives or reagents that promote the formation of inter-fiber bonds during production itself by addition into the substance.

To increase the wet strength according to the second technique, poly(ethylene imines), polyamide epichlorohydrin resins and urea or melamine formaldehyde condensates are for example used as wet-strength agents. The use of such synthetic resins results in permanent wet strength. On the other hand, however, enhanced wet strength can also be achieved by addition of water-soluble starches or starch derivatives. This effect is nevertheless only temporary and decreases as soon as the starch derivative dissolves. Apart from the aforementioned additives, modified soluble cellulose derivatives are used as wet-strength agents. In this way, for example, the addition of carboxymethyl cellulose is usual as an additive besides the aforementioned polyamide epichlorohydrin resins.

To bond cellulose fibers together according to the second technique, thereby increasing the strength, U.S. Pat. No. 5,873,979 teaches the reaction of the cellulose's hydroxy functions with a C2–C9 dicarboxylic acid.

A similar approach lies in the crosslinking of the hydroxy functions of the cellulose via metal atoms. This is taught for example by GB-1 385 895 that relates to a method of increasing the strength of fibrous cellulose-containing materials by addition of zirconium compounds. JP-A-63-211399 teaches the addition of a zirconium compound to a suspension of zirconia fibers and cellulose fibers in the case of wet paper making. The resultant zirconia paper ply is soft and is easy to handle as packaging material. According to JP-A-6-17399, a zirconium compound (preferably ammonium zirconium carbonate (AZC)) is added to a pulp suspension in order to reduce the adhesion of accompanying viscous components to the paper machine and to improve its operating, as well as to produce micro projections on the surface of the base paper, thereby improving gravure printing properties without lowering the inter-ply strength.

SU-A-1 268 649 and SU-A-1 268 648 disclose a crosslinking agent based on a water-soluable, hydroxy-containing polymer, e.g. starch or carboxymethylcellulose and a water-soluble zirconium salt which, in combination with polyacrylamide treatment, increases paper's mechanical strength. U.S. Pat. No. 4,647,505 teaches the treatment of cellulose fibers, e.g. chemical wood pulp with titanium and/or zirconium compounds to increase their suitability as a strengthening agent in cement products.

Modified techniques for increasing the strength of paper in the wet state are taught in the following applications filed by the Procter & Gamble Company: WO 97/36051, WO 97/36053, WO-97/36037, WO 97/36054 and WO 97/36052.

WO 97/36051 describes paper that exhibits a temporary wet strength and which is obtained by linking a polyhydroxy polymer (e.g. cellulose) to 1,2-disubstituted alkene carboxylic acid, oxidative cleavage of the dual bond of the alkene carboxylic acid into aldehyde functions and crosslinking the hydroxy groups of the polyhydroxy polymer with the aldehyde functions.

WO 97/36053 describes a paper product exhibiting temporary wet strength and comprising (a) cellulosic fibers and (b) a binder which has (b-i) a polyaldehyde polymer and (b-ii) a water-soluble polysaccharide with cis-OH groups.

WO 97/36037 describes the aldehyde-modified cellulosic fibers upon which the paper product according to WO 97/36051 is based.

WO 97/36054 discloses a compound that bestows temporary wet strength on paper products and which comprises the ozone oxidation product (containing aldehyde groups) of a polysaccharide in which the OH groups in at least one recurrent unit of the polysaccharide are OH groups in cis position. This document also describes a paper product that comprises cellulosic fibers in combination with the above compound and a method of producing the compounds of the paper product.

WO 97/36052 describes a paper product exhibiting initial wet strength and comprising
(a) cellulosic fibers having free aldehyde groups originating from cellulosic fibers that include a polysaccharide (preferably galactose and/or mannose) in which the OH groups of least a part of the recurrent units are OH groups in cis position, in combination with
(b) a water-soluble polymer having functional groups that can react with the aldehyde groups.

Since cellulose exhibits OH groups in trans position, the hemicellulose portion of pulps that have a high proportion of hemicellulose is to be oxidized and the oxidation product used as a "binder". Hemicelluloses are derived from (poly) saccharides with OH groups in cis position (e.g. galactose, mannose) that can be rapidly oxidized into aldehyde groups and which can then form (hemi)acetal bonds in accordance with the teaching of this document, such bonds holding the paper product together.

The five aforementioned applications express the assumption that the achieved temporary wet strength is attributable to the formation of hemi(acetal) bonds between the hydroxy groups of the cellulose and the generated aldehyde functions which bestow a higher strength upon the products than pure hydrogen bridges, but which break up relatively quickly upon contact with water.

The present invention's object is therefore
to make available a cellulose-containing fibrous material that can also result in paper/nonwoven (products) without use of additives and exhibiting suitable strength parameters;
and to make available the production processes for this fibrous material, paper/nonwovens and paper/tissue paper/nonwoven products.

This object is solved by a crosslinkable cellulose-containing fibrous material in which OH functions at the C(6) of the glucose unit of the cellulose are oxidized into aldehyde and/or carboxyl groups that can be crosslinked with a metal selected from transition metals of the groups IVa, Va, VIa, VIIa and VIIIa, zinc and aluminum.(According to the new IUPAC nomenclature, groups IVa, Va, VIa, VIIa and VIIIa are referred to as 4 (Ti, Zr, Hf), 5 (V, Nb, Ta), 6 (Cr, Mo, W), 7 (Mn, Tc, Re) and 8–10 (Fe, Ru, Os; Co, Rh, Ir; Ni, Pd, Pt), respectively).

The present invention also relates to a paper/tissue paper/nonwoven, whereby within the framework of the present invention, the tissue paper forms a particularly preferred embodiment of the paper that contains the crosslinked fibrous material; the invention likewise relates to a paper/nonwoven product, particularly a tissue product, composed of at least one ply of paper/nonwoven according to the invention. Each ply may comprise one or more layers that include the fibrous material according to the invention.

Lastly, the present invention's subject matter is also constituted by methods of producing the fibrous material, paper/nonwoven and the paper/nonwoven product.

Crosslinkable Cellulose-containing Fibrous Material

In the cellulose-containing fibrous material according to the invention, hydroxy groups at the C(6) of glucose units of the cellulose are oxidized into aldehyde and/or carboxy groups and can be crosslinked with a metal selected from transition metals of the groups IVa, Va, VIa, VIIa and VIIIa, zinc and aluminum.

This does not exclude the fact that the metal also crosslinks OH functions of the cellulose. In accordance with the invention, it is not ruled out either that besides C(6) aldehyde and/or carboxy groups, other oxidized functions are present in the cellulose.

Cellulose is defined here as the long-chain fibrous portion insoluble in 10% (wt. %) NaOH ($R_{10}$ portion) and which is also known in older literature as α-cellulose (to determine-the $R_{10}$ value see ASTM Method D1695, Annual Book of ASTM standards, Section 15, Vol. 15.04, American Society for Testing and Materials, Philadelphia 1983 and "Cellulose Chemistry and its Applications", edited by T. P. Nevell and S. H. Zeronian, Ellis Harwood Pub., West Sussex, England 1985, p.16 et seq.).

The cellulose portion ($R_{10}$ value) is preferably at least 50%, particularly at least 85%, relative to the total weight of the oven-dried fibrous material (The term "oven-dried" refers to the determination of the dry content of fibrous material/pulp samples corresponding to DIN EN 20638). Greater preference is given to values of at least 90%, particularly of at least 95%.

Cellulose is present in the cells, particularly of lignified plants, in a proportion of up to 50% of the mass, whereas hemicelluloses and lignin account for the remaining 50% of the mass of lignified plant, depending on the particular variety in varyingly large proportions (see Dietrich Fengel and Gerd Wegener, Chemistry, Wood, Ultrastructure, Reactions, Walter de Gruyter (1984)).

The pulps that can be used according to the invention for the purpose of oxidation/crosslinkage are not subject to any specific restrictions regarding the degree of polymerization (DP) of the glucose molecules in the cellulose, the wall layer of plant cell from which the cellulose originates, the type of plant cell from which the cellulose originates etc., there being differences specific to the origin in each case. Since the structure of the plant cell wall is inhomogeneous and this inhomogeneity exhibits distinct features of layering (texture), individual cell wall layers can be clearly distinguished from one another. A distinction can also be made with regard to the type of plant cell. In addition to tracheids or fibrous tracheids, vascular cells or libriform fibers or parenchymatous cells, inter alia, thus occur in cellulosic fibrous materials. There are also consideradble differences regarding the layering in the various plant cells.

The cellulose in the cellulose-containing fibrous material preferably has a number-averaged molecular weight of 3000 to 1 million g/mol, particularly 3000 to 10,000 g/mol.

An essential feature of the invention is that the cellulose itself, and not just accompanying portions of the cellulose-containing fibrous material (e.g. hemicellulose in pulp), exhibits aldehyde and/or carboxyl groups.

The cross section of the plant cells that form the fibrous material according to the invention, and the ratio of the wall to lumen may fluctuate within broad limits due to the plant's morphology. This is caused by the fact that it is possible to distinguish between different cells within a plant (see Dietrich Fengel and Gerd Wegener; Wood, Walter de Gruyter (1984), p. 12, Table 2-2).

In the case of gymnosperms and most of the angiosperms, this is caused by the formation of spring wood and late wood and the formation of reaction wood. The formation of reaction wood occurs on the pressure side in the case of angiosperms, whereas it is formed on the tensile side in the case of gymnosperms. It is typical that in the case of reaction wood, the ratio of wood to lumen compared to other plant cells is much larger, i.e. the remaining lumen diameter of these cells is much smaller.

In addition, as mentioned above, it is possible to differentiate within the wall of the plant cell with regard to layering. Upon considerable magnification, this layering can be represented even in visible light (see Dietrich Fengel and Gerd Wegener; Wood, Walter de Gruyter (1984), p. 13, Fig. 2-12 b; p. 15, Fig. 2-14).

The fibrous material according to the invention is characterized by aldehyde and/or carboxyl groups on the C(6) of the glucose unit of the cellulose. A cellulose chain solely oxidized at C(6) is described by the following formula:

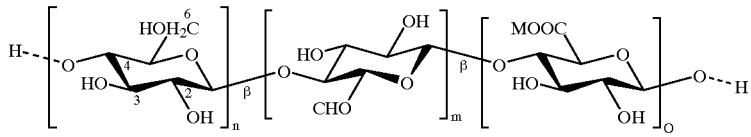

where the above units may be statistically distributed over the chain, M is hydrogen or a cation, and n, m and o may be 0 or an integer ≧1, on condition that m and/or o is not 0.

The total content of aldehyde and/or carboxyl groups at C(6) is preferably more than 50 or more than 100 μmol/g dry weight (oven-dried) of the fibrous material, particularly more than 150 µmol/g. Even greater preference is given to values of more than 200 µmol/g, particularly more than 250 µmol/g.

The content of oxidized groups in the fibrous material according to the invention is analytically determined as explained in the examples.

The crosslinking metal in the fibrous material according to the invention is selected from transition metals of the groups IVa, Va, VIa, VIIa, VIIIa, zinc and aluminum. It is preferably non-toxic and non-coloring. The use of zirconium or aluminum is preferred.

Paper/tissue Paper/nonwoven According to the Invention

The introduction of the description is referred to for the definition of the terms "paper", "tissue paper" and "nonwoven" It should be mentioned that the term "tissue" includes material with outer and/or inner creping, the latter being obtainable by (wet) rush transfer techniques.

The paper/tissue paper/nonwoven according to the invention comprises the fibrous material according to the invention. Other fibers can optionally be added in quantities of preferably up to 95 wt. %, relative to the total weight (oven-dried) of the paper/tissue paper/nonwoven.

Even if it is possible according to the invention to achieve an increase in strength without wet-strength agents, the addition of wet-strength agents may be appropriate in individual cases in order to achieve a further improvement in strength properties (preferred maximum content: 20% wt. %, relative to the total weight of the oven-dried paper/tissue paper/nonwoven). Examples of suitable wet-strength agents are: carboxymethylcellulose, PAE (polyamine-amido-epichlorohydrin resin), polyacrylamide, urea formaldehyde resins and prepolymers thereof, melamine formaldehyde resins and prepolymers thereof as well as phenol formaldehyde resins and prepolymers thereof.

The paper/nonwoven according to the invention is preferably a hygiene paper, particularly a tissue paper. It preferably has a basis weight of up to 225 g/m². In the case of a (one-ply) tissue paper, the basis weight is usually at least 8 g/m², preferably 10 to 60 g/m², with greater preference on 13 to 40 g/m², particularly 15 to 30 g/m².

The term "paper/nonwoven", or "tissue paper", is used here for planar products having a ply composed of at least one layer, this ply having a portion of preferably at least 10% fibrous material according to the invention, with further preference for at least 20%, further preference for at least 30%, even further preference for at least 50%, and most preference for at least 70% of this fibrous material. The ply may, however, comprise a plurality of layers, preferably 1–10 layers, depending on the production process. (The term "paper/nonwoven product" explained in the following section is used for planar (end) products having one or more plies. Each ply comprises at least one layer; each layer may differ in terms of its material composition). The term "layers" refers to a change in physical and/or chemical properties perpendicular to the layer plane, caused e.g. by the use of different fibrous raw materials per layer, as is possible by systematic fiber feed at the headbox of the paper machine. Headboxes of paper or tissue machines usually have one-, two- or three-layer headboxes, thus enabling very systematic layering within the ply, which leads to an improvement in the mechanical properties. The fibers are bonded together within the layer and between the layers by hydrogen bridges and/or covalent bonds and/or other conceivable chemical and physical forces such that nondestructive separation of the layers is no longer possible or possible only with difficulty. The term "ply" on the other hand describes the planar fibrous material product comprising one or more layers, as usually obtained on the paper machine, particularly the tissue paper machine, or as obtained as a continuous web during nonwoven production. In the case of a planar fibrous material product that comprises a plurality of plies, these plies are usually brought together after drying the web. The term "plies" is therefore used if separation is easily possible (for example most of the multi-ply paper handkerchiefs can be separated into the individual plies as a result of pulling them apart).

The paper/nonwoven (particularly tissue paper) according to the invention exhibits the following strength parameters which each refer to measurements on a "ply".

For those reasons explained at the start, the wet tear length of the paper/tissue paper/nonwoven according to the invention is less than the dry tear length. The wet tear length is preferably more than 90 m, greater preference being given to more than 470 m, particularly more than 750 m. The wet tear length corresponds to the (theoretical) length of a wet paper web in which the web would tear under its own weight.

The paper according to the invention has a tensile strength (width-related breaking strength) in the dry state of preferably more than 20 N/15 mm, greater preference being given to more than 25 N/15 mm and most preference being given to 50 to 70 N/15mm.

The paper according to the invention has a tensile strength (width-related breaking strength) in the wet state of preferably more than 1.25 N/15 mm, greater preference being given to more than 5 N/15 mm and most preference being given to 9 to 15 N/15 mm.

The values for wet tear length and tensile strength (wet, dry) refer to the measuring technique described in the examples.

The tensile strength values achieved may vary for example in accordance with the selected starting product (pulp), the basis weight of the paper/tissue paper/nonwoven, the type and quantity of the oxidizing agent and the oxidation conditions. In each case, however, the invention makes it possible to increase the absolute and relative wet strength as compared to untreated cellulosic fibrous material, particularly pulp. Relative wet strength is the quotient from the wet tensile strength and the dry tensile strength and indicates the extent to which a paper/tissue paper or paper product/tissue product retains its strength after being moistened with water. The present invention makes it possible to achieve papers with relative wet strengths of preferably at least 5%, particularly more than 12%. Even greater preference is given to values of more than 20% or more than 40%.

Without prior mechanical treatment (beating), the WRV (water retention value) of the lignocellulosic fibrous material used to produce the paper preferably amounts to 50–250%, particularly 100–160%. The WRV was calculated as indicated in the examples.

Paper/tissue Paper/nonwoven Product According to the Invention

The paper/tissue paper/nonwoven product according to the invention comprises at least one ply of the paper/tissue paper/nonwoven according to the invention. It is preferably a hygiene paper product, particularly a tissue product. Tissue products contain one or more plies, preferably 1–10 plies, greater preference being given to 2 to 6, particularly 2 to 4 plies.

The tissue product is preferably
- a cleaning wipe, e.g. paper wipe, a windscreen cleaning wipe, a cleaning wipe for industrial applications, a towel or a cleaning wipe for household use, e.g. kitchen paper;
- a sanitary product, e.g. toilet paper (also moist);
- a paper handkerchief (also moist);
- a household towel, e.g. kitchen towels;
- a towel;
- a tissue for facial use, e.g. a makeup removal tissue (facial) or cosmetic tissue,
- a serviette/napkin,
- bed linen;
- garment, e.g. disposable apparel for hospital or kitchen staff.

Toilet paper, paper handkerchiefs and cosmetic tissues may be refined by lotioning, e.g. by application of lotions containing softness-enhancing and/or skin-care or other active cosmetic ingredients The paper/tissue paper/nonwoven product according to the invention, particularly tissue product, may exist as a sheet, single sheet or as a roll, optionally divided into sheets. It may be folded or unfolded, embossed or unembossed, printed or unprinted, perforated or unperforated and/or it may have undergone finishing e.g. by application of lotions.

In the case of single-ply products, the mechanical properties of the paper/tissue product/nonwoven product correspond to the above-indicated values. The strength values increase as the number of plies rises.

The paper/tissue product/nonwoven product according to the invention preferably has the aforementioned basis weights in the case of just one ply. If there are several plies, the basis weight correspondingly rises with the number of plies.

Method of Producing the Fibers, the Paper/tissue Paper/nonwoven and the Paper/tissue Paper/nonwoven Product The production of the fibrous material according to the invention and the product obtainable therefrom entails
(A) the oxidation of the OH functions at the glucose C(6) of the cellulose in cellulose-containing fibrous a material into aldehyde and/or carboxy groups, and
(B) crosslinking the oxidized fibrous material with a metal-containing crosslinking agent selected from transition metals of the groups IVa, Va, VIa, VIIa and VIIIa, zinc and aluminum.

The pulp density of the fibers used for oxidation usually amounts to 0.05 to 30%, particularly 0.05 to 5%, expressed as the dry weight of the fibers (oven-dried) per weight of the medium. The oxidizing medium is preferably aqueous; other oxidizing media, e.g. combinations of water and a water-miscible solvent, e.g. alcohol, can also, however, be used so long as the water-miscible solvent is not attacked by the oxidizing agent.

The amount of oxidizing agent is preferably 0.005 to 70 wt. %, particularly 0.05 to 50 wt. %, greater preference being given to 0.05 to 30 wt. %, particularly 0.05 to 15 wt. %, relative to the dry weight (oven-dried) of the fibrous material.

Depending on the oxidizing agent in use, oxidation is preferably performed at a temperature of 1° C. to 120° C., particularly 1 to 50° C. The reaction time preferably amounts to 5 min to 15 hours, particularly 30 min to 7 hours.

A combination of reaction conditions (concentration, pH, temperature, reaction duration etc.) which does not result in the destruction of the fibrous structure is preferably chosen. Individual examples of the combination of such conditions will be explained below with the corresponding oxidizing agents.

Oxidation of the starting material may be effected with any oxidizing agent that oxidizes the OH functions at the C(6) of the glucose unit of the cellulose (for the sake of simplicity, just "C(6)" will be referred to hereinafter) into aldehydes and/or carboxyl groups. Suitable oxidizing agents are for example ozone, periodate, dinitrogen tetroxide ($N_2O_4$), dimethyl sulfoxide/acetic anhydride, gaseous oxygen, hypochlorite, hypobromite, chromic acid and chromates, hypochlorous acid, hypobromous acid, hypoiodous acid, peracids, peroxides (e.g. hydrogen peroxide), persulfates, perborates, perphosphates, periodates, oxidizing metal compounds, nitroxy compounds, particularly the so-called TEMPO oxidizing systems, and suitable combinations thereof, halogen-free oxidizing agents being preferred. Consequently, oxidizing agents that are typically used to bleach or delignify pulp are also suitable, so far as these agents also effect oxidation at C(6).

Surprisingly, it was possible to find that a significant rise in dry and wet strength can be achieved by bleaching using oxidative bleaching agents such as peracetic acid and by the associated introduction of COOH— or CHO groups and subsequent crosslinkage with a metal. The use of a thus treated fibrous material containing lignocellulose and/or cellulose is particularly suitable for the production of a planiform fibrous material product with wet-strength properties, because no other additives have to be used to increase wet strength, though this is not to rule out the addition of e.g. PAE, CMC or polyacrylamides. Pulps exhibiting a high proportion of lignin as an accompanying substance and treated with peracetic acid also already exhibit a sufficiently high number of oxidized groups in order to be reacted with the metallic crosslinker.

Upon oxidation with dinitrogen tetroxide, $C_6$ carboxyl-functionalized cellulose is formed as the main product and C(2,3) dialdehyde, C(2,3) dicarboxyl and C(2,3) diketone groups are formed as a by-product, whereby further forms of oxidation are not excluded.

Dinitrogen tetroxide has the ability to react not only with the hydroxy groups located on the surface of the groundwood fiber and/or particularly the pulp fiber, but also penetrates into the interior of the fiber structure without destroying the fibrous structure.

Oxidation on the fiber surface is preferred, however, which can be achieved in that the lumen of the pulp fibers is reduced by compression before and/or during oxidation.

Sodium hypochlorite as a sole oxidizing agent leads to a low carboxyl content under mildly acidic conditions and results in higher carboxyl contents under alkaline conditions, though the oxycelluloses obtained under mildly acidic conditions tend toward a yellow coloration and to degradation.

A sterically screened organic nitroxy compound is preferably used. One, particularly two bulky groups in the α position to the NO is/are suitable for sterically screening the NO group, e.g. optionally substituted phenyl or aliphatic substituents that are linked to the nitrogen atom of the NO by a quaternary C atom, e.g. tert-butyl. Two substituents can also be combined into an alkenyl unit optionally interrupted by a hetero-atom (e.g. O,N) (to form an alicyclic or heterocyclic ring).

Oxidation with nitroxy compounds usually leads, via the aldehyde function, to the carboxy function, the choice of oxidizing system and oxidation conditions making it possible to control the reaction such as to isolate the aldehyde stage. The proportion of carboxy groups usually rises as the reaction duration increases.

Preferred oxidation systems can be represented by the following formula I

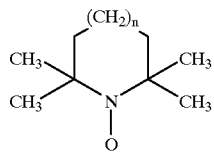

(I)

where n=0 or 1 and where the methylene groups of the ring may carry one or more substituents selected from alkyl, alkoxy, aryl, aryloxy, amino, amido (e.g. acetamido, 2-bromacetamido and 2-iodacetamido), oxo, cyano, hydroxy, carboxyl, phosphonooxy, maleimido, isothiocyanato, alkyloxy, fluorophosphinyloxy (particularly ethoxyfluorophosphinlyoxy), substituted or unsubstituted benzoyloxy, e.g. 4-nitrobenzoyloxy. If n=1 (i.e. the ring represents a piperidine), these groups preferably substitute the 4-position of the piperidine. The di-tert.-alkyl nitroxy unit can also be present as part of a polymer structure such as $\{(CH_3)_2-C-(CH_2)_{2-3}-(CH_3)_2-C-NO-\}_m-$. Hydroxy, amino and amido are preferred among these substituents on account of the stability of the nitroxy compound under acidic conditions.

An example of n=O is PROXYL (2,2,5,5-tetramethylpyrrolidine-N-oxyl).

Among the formula I compounds, the case of n=1 is preferred. This leads to the optionally substituted TEMPO compounds (2,2,6,6-tetramethyl-4-piperidine-N-oxide) which can selectively oxidize the primary hydroxy group at C(6) of the glucose unit of the cellulose into aldehyde and/or carboxyl groups.

The nitroxy compound can be used stoichiometrically or in combination with a primary oxidizing agent capable of returning the nitroxy compound to the oxidized state after its consumption (reduction) (a list of suitable reaction conditions and compounds is found in A. E. J. De Nooy, Synthesis 1996, 1153–1174). The pH range of the reaction generally varies between 1 and 14, preferably 2 and 7, particularly 3 and 6. The reaction temperature is preferably between 5° C. and 80° C. The nitroxy compound may be added to a suspension of the fibrous material as a solid (also as a pasty substance) or as a solution (usually as an aqueous solution).

In the second case (nitroxy compound+primary oxidizing agent), preferably first the nitroxy compound and then the primary oxidizing agent is added. The oxidizing agent can be added all at once or distributed over the duration of the reaction (e.g. by evenly adding it in drops). The primary oxidizing agent (e.g. peracetic acid, ozone, hypohalite, metal compounds that contain oxygen) is preferably used in an amount of 0.1 to 20 wt. %, particularly 0.5 to 7.5 wt. %, in relation to the dry weight (oven-dried) of the fibrous material. The catalytic quantity of the nitroxy compound is preferably 0.05 to 15 wt. % relative to the dry weight (oven-dried) of the fibrous material.

In the case of stoichiometric reaction with the nitroxy compound, this compound is used in an amount of 0.005 to 70 wt. %, particularly 0.05 to 50 wt. %, greater preference being given to 0.05 to 30 wt. %, particularly 0.05 to 15 wt. %, relative to the dry weight (oven-dried) of the fibrous material.

One version of performing the oxidation with the formula I nitroxy compound is described in WO 95/07393 which teaches the oxidation with a catalytic amount of the nitroxy compound and a hypohalite (e.g. NaOCl) as a primary oxidizing agent in an aqueous reaction medium at a pH between 9 and 13. Under these conditions, the primary hydroxy group of the cellulose is oxidized via the corresponding aldehyde group into the carboxyl group.

A preferred version lies in the oxidation with a peracid, a precursor or a salt thereof as a primary oxidizing agent in the presence of a catalytic amount of the nitroxy compound (particularly optionally substituted TEMPO) and a catalytic amount of a halide (e.g. NaBr), preferably in the pH range of 2 to 11, particularly 2.5 to 3.5. The halide is preferably used in a quantity of 0.1 to 40, particularly 0.5 to 10 mol % relative to the hydroxy groups. The nitroxy compound is preferably used in a quantity of 0.1 to 2.5 wt. %, relative to the dry weight (oven-dried) of the fibrous material. The peracid is preferably a peralkanic acid, particularly peracetic acid. Depending on the reaction duration, this embodiment of oxidation leads to aldehydes and/or carboxyl groups at C(6) of the glucose unit of the cellulose. It is, however, also possible to perform oxidation just using the nitroxy compound (particularly the formula (I) compound) as a mediator and peracid as an oxidizing agent without halide, particularly bromide Another preferred version lies in the combination of a catalytic amount of the nitroxy compound (particularly optionally substituted TEMPO) and a suitable oxidic compound of a metal of the transition metals of periods Va to VIIIa in the oxidation state of at least +3, e.g. oxides and oxygen-containing ions of manganese, chromium, iron, nickel, ruthenium and vanadium, e.g. vanadium pentoxide, iron oxide, chromium (VI) oxide, chromates and particularly manganese (IV) oxide and salts of permanganic acid. The reaction is preferably conducted at a pH between 2 and 8. The nitroxy compound is preferably used in an amount of 0.1 to 2.5 wt. %, relative to the dry weight (oven-dried) of the fibrous material. The reaction temperature is preferably less than 80° C., particularly 30 to 60° C. Depending on the duration of the reaction, this embodiment of the oxidation leads to aldehydes and/or carboxyl groups at C(6). In a preferred version of this embodiment, the primary oxidation step, i.e. oxidation of the cellulose by the nitroxy compound, can be separated from the secondary oxidation step, i.e. oxidation of the reduced nitroxy compounds by the oxygen-containing metal compound. The oxidation of the cellulose-containing fibrous material (e.g. pulp) can therefore be performed in a first reactor, the discharge from the first reactor can be separated from the oxidized fibers and introduced into a second reactor where it is treated with the insoluble or immobilized metal compound (e.g. a manganese (IV) oxide bed). The metal compounds can then be filtered off and the filtrate guided to the first reactor in a circulating manner. Such methods can also be conducted in a semicontinuous or continuous mode.

Another preferred version lies in the oxidation of the cellulose with a catalytic amount of the formula I nitroxy compound that is hydroxy-, amino- or amido-substituted (e.g. 4-hydroxy TEMPO) at a pH between 1 and 7, particularly 2 to 6. In this version, a hypohalite (e.g. NaOCl) or ozone is particularly suitable as a primary oxidizing agent. The nitroxy compound is preferably used here in an amount of 0.05 to 15 wt. % and the primary oxidizing agent in an amount of 0.1 to 20 wt. %, each relative to the dry weight (oven-dried) of the fibrous material. The reaction temperature is preferably 5 to 50° C. Depending on the reaction duration, this embodiment of oxidation results in aldehydes and/or carboxyl groups at C(6) of the glucose unit of the cellulose. A halogen-free acid, such as sulfuric acid or toluene sulfonic acid, is particularly suitable for setting the pH.

Finally, the nitroxy compound can also be used with oxidoreductases (e.g. peroxidase, e.g. HRPO (horseradish peroxidase)) or other enzymes capable of oxidation as primary oxidizing agents at a pH suitable for the enzyme.

Amido-substituted nitroxy compounds (e.g. 4-acetamido TEMPO) of the aforementioned formula I are also particularly suitable for stoichiometric oxidation at a pH between 1 and 7, particularly 2 to 6, particularly 2 to 3. (In this reaction, halogen-free acids such as sulfuric acid or toluene sulfonic acid are particularly suitable for adjusting the pH.) Under these conditions, the nitroxy compound present as a radical disproportionates into an oxammonium ion that acts as an oxidizing species and a hydroxylamine. After the reaction, the consumed (reduced) form of the nitroxy compound can be regenerated with ozone or another oxidizing agent, preferably in a separate process step. An important advantage of the oxidation version discussed here is the ability to use the choice of a suitable pulp (TCF, see following sections) to conduct the entire paper/nonwoven production method without any chlorine-containing chemicals.

After treatment with the oxidizing agent/system, the thus treated fibrous material can be used either directly or further diluted (diluted to the pulp densities of 0.1 to 1% usual during paper production in the headbox). It is advantageous, however, for the oxidizing agent and any optionally used oxidizing auxiliary substances (e.g. catalysts such as the nitroxy compound) to be removed from the fibers by washing in a separate process step. This may occur by using scrubbers common in pulp production in a displacement or dilution wash. After washing, the fibers can be thickened to a higher pulp density or pressed out by means of usual apparatus (e.g. filters, wash filters, filter presses or other drainage devices). It may optionally be of advantage to destroy the oxidizing agent or oxidizing auxiliary substances by chemical means before washing the fibers. For example, excess hypochlorite can be destroyed by reaction with hydrogen peroxide or sodium bisulfite, thus preventing the hypochlorite from reaching the washing stage.

The crosslinking of the oxidized fibers with a metal preferably occurs after oxidation or optionally after the chemical treatment and/or washing stage to prevent the oxidizing agent from oxidizing the metal-containing crosslinking agent in use. Although treatment with the crosslinking agent is possible during or just after the production of the oxidized fibrous material (e.g. while stil at the pulp plant), it is preferred that crosslinkage should be performed just before or during or after the production of paper/tissue paper/nonwovens (e.g. at the tissue paper plant).

The metal of the crosslinking agent results in a covalent crosslinkage of the aldehyde and/or carboxy groups which increases the strength of a paper or nonwoven made of the fibrous material. The metal may also react with the hydroxyl groups of the cellulose and carboxyl/aldehyde groups contained in the fibrous material, such groups may be present due to fibrous material's pretreatment (e.g. bleaching, delignification). In the case of chlorine-free bleaching of pulps, carboxyl groups may be produced, particularly when peracetic acid or ozone is used as a bleaching agent.

The crosslinking agent in use is preferably a water-soluble metal compound, particularly a water-soluble metal salt. If the intention is to crosslink with zirconium or aluminum ions, ammonium zirconium carbonate (AZC), zirconium acetate or $Al_2(SO_4)_3$ are particularly suitable. The addition of zirconium to fibers oxidized according to the invention has a positive influence on the dry strength of the paper/nonwoven (products) obtained, which becomes noticeable e.g. in the form of a higher breaking length. The accomplished increase in dry strength is higher than in the Zr crosslinkage of non-oxidized fibers. Both zirconium and aluminum also result in a substantial increase in the breaking length in the case of moist paper/nonwoven (products) and lead to an increase in relative wet strength.

With regard to a homogeneous intermixture, the metal-containing crosslinking agent is preferably added in a dissolved form, particularly as an aqueous solution. The crosslinking agent is preferably used in amounts in a ratio of metal (calculated as metal oxide, e.g. $ZrO_2$ or $Al_2O_3$/metal-crosslinked fibrous material (oven-dried)) of at least 0.2 wt. %, greater preference being given to more than 2 wt. %, particularly more than 5 wt. %. Sometimes a proportion of more than 15 wt. % is inappropriate if it does not lead to any further increase in strength.

The crosslinkage is preferably performed at temperatures of 5 to 360° C., particularly 5–99° C. For practical considerations, either room temperature is usually chosen, or the temperature level that is normally set in the production process of the paper/nonwoven (product), whereby it need not be ruled out that the planiform fibrous material product is briefly overheated, as is usually the case when treating the surface of the planiform fibrous material product with a stream of hot flue gases.

To explain in more detail the preferred raw materials used in the fiber production process and the preferred times at which oxidation and crosslinkage is performed during the production of paper/nonwovens, a typical production process for paper/tissue paper/nonwoven products will first be discussed more closely. This method is usually classified into different process steps, for example for pulps as a starting material (the same applies to fibrous materials):

1. production of the pulp modified by oxidation based on raw pulps exhibiting properties adapted to paper/tissue paper/nonwoven production, including the pulp refinement common in the paper production process;
2. processing (including formation, i.e. sheet laying and drying) of the modified pulps into a paper/tissue paper/nonwoven;
3. processing this paper/tissue paper/nonwoven into a paper product/tissue product/nonwoven product.

Upon adjustment of the properties of the pulps recovered from wood by means of normal chemical pulping techniques (e.g. kraft process; sulfite process) in step 1, one or more of the following steps are frequently applied:

(1a) a separating step by fractionating, sorting, washing, floating and/or cleaning (in a fractionating device, a sorting device, a washing device, a floatation cell or a hydrocyclone or another cleaning device)

(1b) dispersing and thickening steps in a dispersing device or e.g. a screen head extruder or screw press (1c) dissolving the fibers (pulping) by deflaking/fiberizing, e.g. in a pulper or fiberizer, a dispersing apparatus or a sorting device (1d) fiber modification in a refiner or other type of beating unit or a pump (1e) storage steps, mixing and dilution steps.

If e.g. linters or cotton is used as a raw material for the production of paper/tissue paper/nonwovens, no further pulping steps are usually needed, however. Due to the morphological structure, the cellulose already exists in an open state.

The starting pulps in use for oxidation may relate to primary fibrous materials (raw pulps) or to secondary fibrous materials, whereby a secondary fibrous material is defined as a fibrous raw material recovered from a recycling process. The primary fibrous materials may relate both to a chemically digested pulp and to mechanical pulp such as thermorefiner mechanical pulp (TMP) or chemothermorefiner mechanical pulp (CTMP). Synthetic cellulose-containing fibers can also be used. Preference is nevertheless given to the use of pulp from plant material, particularly woodforming plants. Fibers of softwood (usually originating from conifers), hardwood (usually originating from deciduous trees) or from cotton linters can be used for example. Fibers from esparto (alfa) grass, bagasse (cereal straw, rice straw, bamboo, hemp), kemp fibers, flax and other woody and cellulosic fiber sources can also be used as raw materials. The corresponding fiber source is chosen in accordance with the desired properties of the end product in a manner known in the art. For example, the fibers present in softwood which are shorter than those of hardwood lend the final product a higher stability on account of the higher diameter/length ratio. If the softness of the product is to be promoted, which is important e.g. for tissue paper, eucalyptus wood is particularly suitable as a fiber source.

With regard to the softness of the products, the use of chemical raw pulps is also preferred, whereby it is possible to use completely bleached, partially bleached and unbleached fibers. The chemical raw pulps suitable according to the invention include, inter alia, sulfite pulps, kraft pulps (sulfate process), soda pulps (cooking with sodium hydroxide), pulps from high-pressure cooking with organic solvents (e.g. organosolv, Organocell, Acetosolv, Alcell) and pulps from modified processes (e.g. ASAM, Stora or Sivola process). Among the kraft pulps, it is possible to use those which were obtained in continuous cooking systems (MCC (modified continuous cooking), EMCC (extended modified continuous cooking) and ITC (isothermal cooking)). The products of discontinuous kraft processes (e.g. RDH (rapid displacement heating), Superbatch and Enerbatch) are also suitable as a starting product. The sulfite processes include the acidic sulfite/bisulfite processes, bisulfite process, "neutral sulfite semi-chemical pulping" (NSSC) process and alkaline sulfite processes such as processes in which in addition to aqueous alkali, sulfite and/or anthraquinone in combination with organic solvents such as methanol were used for cooking, e.g. the so-called ASAM process (alkali sulfite anthraquinone methanol). The major difference between the acidic and neutral or alkaline sulfite processes is the higher degree of delignification in acidic cooking processes (lower kappa numbers). The NSSC process provides semi-chemical pulps which are advantageously defibered in downstream mechanical fibrillation before they are used according to the invention for the purpose of oxidation. The sulfite and kraft pulps considerably differ in terms of their fibrous material properties. The individual fiber strengths of sulfite pulps are usually much lower than those of kraft pulps. The mean pore width of the swollen fibers is also greater in sulfite pulps and the density of the cell wall is lower compared to sulfate pulps, which simultaneously means that the cell-wall volume is greater in sulfite pulps. For this reason, there are also obvious differences regarding water absorption and swelling behavior of the cellulosic fibrous materials, which must also be taken into consideration when selecting the raw material for oxidation.

Before a raw pulp is oxidized in the process according to the invention, it may also be advantageous to allow further delignification to occur in a separate process step. In this way, for example, pulps which were cooked in alkaline pulp production techniques such as the kraft process or ASAM process were cooked in acidic pulp production techniques such as the acidic magnesium bisulfite process, and/or originate from processes in which organic solvents such as methanol (e.g. Organosolv, Organocell, Acetosolv, Alcell) were used should undergo a bleaching process to achieve a more extensive removal of lignin after the cooking process and to obtain a completely cooked pulp.

In this bleaching process, elementary chlorine or chlorine-containing bleaching chemicals such as chlorine dioxide ($ClO_2$) or hypochlorite ($OCl^-$) can be used, although this is not preferred for ecological and strategic marketing reasons. Bleaching with oxygen, hydrogen peroxide or the joint use of oxygen and hydrogen peroxide, not to mention ozone or an oxygen/ozone and/or air/ozone/gas mixture is therefore particularly suitable. Bleaching with peracetic acid is also suitable as a bleaching agent that contains oxygen, it being irrelevant whether it is a question of equilibrium peracetic acid or distilled peracetic acid. Caro's acid can also be used as a peroxide chemical under acidic pH conditions for the purpose of bleaching. The avoidance of chlorine-containing bleaching chemicals produces ECF (elemental chlorine free) or TCF (total chlorine free) pulps which are preferred according to the invention. In addition to the bleaching agent, reducing bleaching agents such as dithionite ($S_2O_4^{2-}$) or foramidine sulfonic acid (FAS) can be used to brighten the fibrous material. It should be mentioned here that the use of these bleaching chemicals, particularly when using ozone or ozonized oxygen or an ozone/air mixture, may, to a slight extent, also result, as a side reaction, in the formation of carboxyl and carbonyl groups in the cellulose chain. This nevertheless only leads to a smaller increase in static strength properties, but a significant improvement regarding wet strength is not usually observed.

It is also preferred that before oxidation, the chemical pulp should undergo additional surface treatment (beating) which has a favorable effect on the strength properties of the obtained paper/tissue paper/nonwoven product. This may be preferably brought about within the pulp refinement system of a paper/tissue paper machine. In another preferred embodiment, such surface treatment (beating) occurs as part of pulp production, i.e. while it is still at the pulp plant. A refiner is particularly suitable for this purpose. Fibrillation of the surface occurs during mechanical treatment of the pulp/water suspension. This treatment affects the static and dynamic strength properties. Fibrillability of the fiber crucially depends on the fiber's swelling capability. In this way, it is known that due to a low polyuronic acid content, kraft pulps produced according to the sulfate process are less readily beatable. Effects of beating in accordance with e.g. the specific edge load, total energy expenditure etc. are discussed in detail by the following authors: Lothar G öttsching, Stofftechnologie-Mechanische Faserbehandlung; Wochenblatt für Papierfabrikation 23/24, (1998), 1194; M. L. Wild, Festigkeitsentwicklung von Holz- und Deinkstoff aus Zeitungsdruckpapier mit niedriger spezifischer Kantenbelastung; Wochenblatt für Papierfabrikation 23/24, (1998), 1218. The bleaching of fibrous materials containing lignocellulose also considerably affects their grindability and the beating result. (Jorma Lumiainen, Refinermahlung von ECF-, TCF- und chlorgebleichten Zellstoffen unter äquivalenten Bedingungen, apr (Allgemeiner Papier Rundschau), 33 (1998), 768).

Fibrillation of the fibers during beating occurs either by the fibers themselves or by the refiner knives. During beating, the fibers are subjected to a variety of physical loads. Axial and tangential shearing and compressive forces acting upon the fiber play a particular role as regards fiber reforming. This leads to a change in fiber morphology. In this way, the outer primary wall is the first to be separated. The associated change in fiber morphology can be described as follows:

a) tearing open and removing the fibrous material's outer wall layer designated as the primary wall;
b) exposing the fibrils and fibrillation out of the wall layers designated as S1 and S2;
c) partially shortening the total fiber unit or producing accepts by shearing off fibrils.

The beating effect is also determined by the hemicelluloses which influence beating as a result of the amorphous structure and their easy swelling capability. A phenomenon known in the formation of nonwovens is the so-called Campbell effect that describes how the fibrils come closer during nonwoven formation. As soon as so much water is removed from the nonwoven that the fibrils come closer and capillarity occurs, they are pressed together as a result of the capillary pressure and form hydrogen bridges (secondary valence forces) in the course of drying. The hemicelluloses with water as a polar liquid may also lead to the formation of a gel that causes the fibers to agglutinate. The influences of the cutting angle of the ribs and grooves attached to the beating unit in relation to the change in characteristic of the fibrous material are described in PTS Research Report: G. B är, Faserstoffoptimierung durch modifizierten Mahlprozess PTS-FB 19/98, 1st edition, (1998).

Depending on the refiner's operating mode, the fibers are shortened (cut) or are fibrillated, which includes the separation of the outer layers of the fiber wall, this latter process substantially increasing the surface and bonding capacity of the fibers. The refiner operating mode that accompanies fibrillation is therefore preferred (to simplify matters, this process step will also be designated as beating in the following). Beating is particularly used in the case of chemical pulps.

It is preferred that neither the raw pulp, as is obtained e.g. from any kind of pulping process, nor a completely wood-free cellulosic fibrous material should undergo drying before it is supplied to the stage in which paper/tissue paper/ nonwoven is formed. This makes it possible to perform oxidation of the fibers in a completely swollen state. So long as the oxidation reaction has not already occurred to a sufficient extent during bleaching, or the introduction of other groups is desirable, it is therefore possible to continue oxidation in the swollen state. In accordance with the prior art, the raw pulp or final pulp is usually first brought into the air-dried state and not until directly before processing into a paper/tissue paper/nonwoven product is it brought into a water-saturated state. In this way, storable pulps are obtained which do not have to be processed immediately after the production process. Due to the effect known as drying hysteresis, however, the swelling state that can be achieved before drying is no longer achieved upon re-moistening. As a result, the accessibility of the fibers for the oxidizing agent is decreased. If the pulp is consequently not dried in the above-described special embodiment of the invention, the accessibility of the fibers for the oxidizing agent is increased and an additional rise in wet strength can be achieved.

Depending on the type of paper, the second process section (paper/tissue paper/nonwoven formation) may include the typical process steps of sheet making, pressing, drying, sizing (in the case of paper production) and smoothing.

If tissue paper is to be made, process section 2 essentially comprises 2a forming that includes the headbox and the screen portion,
2b the drying portion (TAD (through air drying) or conventional drying on the yankee cylinder) that also usually includes the crepe process essential for tissues,
2c the monitoring and winding area.

Formation of the paper can be achieved by placing the fibers, in an oriented or random manner, on one or between two endlessly revolving screens of the paper making machine while simultaneously removing the main quantity of water of dilution until dry-solids contents of usually between 12 and 35%.

Drying the formed primary fibrous web occurs in one or more steps by mechanical and thermal means until a final dry-solids content of usually about 93 to 97%. In the case of tissue making, this stage is followed by the crepe process which crucially influences the properties of the finished tissue product in conventional processes. The dry crepe process that is predominantly in use today involves creping on a usually 4.5 to 6 m diameter drying cylinder, the so-called yankee cylinder, by means of a crepe doctor in the case of the aforementioned final dry-solids content of the raw tissue paper (wet creping can be used if lower demands are made of the tissue quality). In the next step, the creped, finally dry raw tissue paper (raw tissue) is then usually wound on to a supporting core to form a so-called reel drum or is wound in a longitudinally cut manner on cores to form master rolls and is available in this form for further processing into the paper product or tissue paper product according to the invention.

Instead of the conventional tissue making process described above, the invention gives preference to the use of a modified technique in which an improvement in specific volume is achieved by a special kind of drying within procdess section 2b and in this way an improvement in the bulk softness of the thus made tissue paper is achieved. This process, which exists in a variety of subtypes, is termed the TAD (through air drying) technique. It is characterized by the fact that the "primary" fibrous web that leaves the sheet making stage is pre-dried (like a nonwoven) to a dry-solids content of about 80% before final contact drying on the yankee cylinder by blowing hot air through the nonwoven fabric. The nonwoven fabric is supported by an air-permeable screen or belt and during its transport is guided over the surface of an air-permeable rotating cylinder drum. Structuring the supporting screen or belt makes it possible to produce a random pattern of compressed zones broken up by deformation in the moist state, resulting in increased mean specific volumes and consequently leading to an increase in bulk softness without decisively decreasing the strength of the nonwoven fabric. Another possible influence on the softness and strength of the raw tissue lies in the production of a layering in which the primary nonwoven fabric to be formed is built up by a specially constructed headbox in the form of physically different layers of fibrous material, these layers being jointly supplied as a pulp strand to the sheet making stage. The surface softness can be significantly increased by suitably selecting the raw materials in the headbox outlet nozzle channels that determine the layering, for example by using eucalyptus fibers and/or wattle, at the nonwoven side facing toward the yankee cylinder surface, which benefits the products manufactured from raw tissue production. In this way, the operating characteristics ("runnability") of a tissue machine, such as a conventionally operating tissue machine, can also be improved.

When processing the raw nonwoven or raw paper into the final product (third process section), the following procedural steps are normally used individually or in combination: cutting to size (longitudinally and/or cross cutting), cutting to size, producing a plurality of plies, producing mechanical ply adhesion, volumetric and structural embossing, application of adhesive, folding, imprinting, perforating, application of lotions, smoothing, stacking, rolling up.

To produce multiply tissue papers, such as handkerchiefs, toilet paper, towels or kitchen towels, an intermediate step preferably occurs with so-called doubling in which the raw tissue is usually unwound in a reel drum number corresponding to the finished product's desired number of plies and is wound on a common multiply master roll. This processing step frequently includes smoothing or calendering in two-roll or multi-roll calenders. After completion of drying and creping, smoothing (calendering) may also, however, be performed in the tissue machine directly before reeling up.

The processing step from the raw tissue that has already been optionally wound up in several plies to the finished tissue product occurs in special purpose-built processing machines which include operations such as repeated smoothing of the tissue, edge embossing, to an extent combined with planar and/or local application of adhesive to produce ply adhesion of the individual plies (raw tissue) to be combined together, as well as longitudinal cut, folding, cross cut, placement and bringing together a plurality of individual tissues and their packaging as well as bringing them together to form larger surrounding packaging or bundles. Instead of edge embossing, the production of ply adhesion can also be achieved by edging, as is common e.g. in the case of cosmetic tissues. The individual paper ply webs can also be pre-embossed and then combined in a roll gap according to the foot-to-foot or nested methods.

Timing of oxidation: with regard to the consumption of oxidizing agent, it is preferred that oxidation should be performed on as pure fibrous material as possible (having as high a cellulose content as possible). Oxidation of the fibers therefore preferably occurs during process section 1, tending to be performed here at the end of process section 1, e.g. directly before laying the sheets.

Within pulp production, the oxidation of fibrous material (the primary hydroxyl group of the C6 atom on the glucose rings of the cellulose chain molecules, preferably the fiber wall, particularly at those of the easily accessible outer fiber wall), may be integrated into pulp production as a separate process step in the form of an optionally additional refining stage.

As defined by the invention, the term pulp production includes any technology or processes that can be used to recover cellulose-containing fibrous materials from raw vegetable materials which are then suitable as a raw fibrous material for the production of planar materials, optionally composite planar materials, such as paper, especially tissue paper, cardboard, board, fiberboards, nonwovens and the like. It is irrelevant whether the decomposition of the vegetable fiber composite (cell unit, e.g. the ligneous substance of suitable types of wood) into useful single fibers is performed by chemical pulping, which depending on the degree of pulping (yield) leads to the chemical pulps and semi-chemical pulps, or whether pulp production is brought about by mechanical means by expending mechanical energy and/or heat energy optionally by also using chemicals that assist the pulping process, such as chippings of suitable kinds of wood, which leads to the group of mechanical pulps including for example groundwood pulp, TMP, CMP, CTMT, HTCTMP and other mechanical pulps. It is important that the chemical pulps predominantly comprise cellulose and hemicelluloses having a residual lignin content dependent on the pulping process, degree of pulping and bleaching, the other accompanying substances such as waxes and minerals being of secondary importance. In contrast, the mechanical pulps are characterized by their very high lignin content, becamse again in accordance with the pulping process, e.g. in the case of groundwood pulp, MP or TMP, the original lignin content characteristic of the plant is de facto retained or decreases only to a slight extent if thermal and/or chemical energy is additionally applied.

In this way, it is possible to provide the modification of fibrous material by oxidation as an integral component of pulp production. This oxidation stage is equipped with all the apparatus needed to perform the modification of the fibrous material, as stated above and described below in another part of the specification text, and in the case of chemical pulp production, is embedded into the overall process of pulp production at a suitable point, for example during bleaching in combination with washing. As a result, a modified fibrous material or a modified pulp is obtained which can be used for example as a starting product for paper production.

A further particularly preferred embodiment of the invention envisages integrating oxidation for the modification of the fibrous materials into the pulp refinement stage of a paper machine, particularly a tissue paper machine, in order to make fibrous raw materials suitable for paper production and particularly tissue paper production available by modification of cellulose-containing fibrous materials, particularly pulps of fibrous wood, irrespective of the pulping process, whether produced in acidic or neutral or alkaline conditions, whether produced in single-stage or multi-stage processes or whether produced with or without bleaching; the use of such fibrous raw materials in sheet making leads to paper or raw tissue which is characterized by improved strengths, particularly improved wet strength, by dimensional stability of the product, by high absorbency for liquids such as water with good textile-like flexibility of the final products made therefrom, as compared to those kinds of paper or raw tissue paper which are made of otherwise comparable, albeit unmodified fibrous raw materials in comparable production conditions.

In an embodiment of the invention, the total fibrous raw material supplied to a machine can be modified by oxidation within the oxidation stage integrated into a pulp refinement section of a paper machine, particularly a tissue paper machine.

According to a further embodiment, however, just a partial amount of the fibrous raw material needed by a paper or tissue paper machine can optionally be modified by oxidation of the kind according to the invention and used in combination with unmodified fibrous raw material.

Another preferred way of obtaining a starting or intermediate product according to the invention, such as an endless web of paper or raw tissue, is to keep separate the fibrous material modified by oxidation in accordance with the invention or optionally to keep the modified fibrous materials separate within the pulp refinement stage as fibrous raw materials with different properties and to guide them each in a separate channel of a multi-layer headbox and to supply the unmodified fibrous raw materials to sheet making through optionally additional parallel channels of the multi-layer headbox together with the modified fibrous raw materials in the form of a layered jet.

The timing of the addition of the crosslinking agent depends on the specific production techniques used for the paper/tissue paper/nonwoven and/or paper/tissue paper/ nonwoven product. In general, preference is nevertheless given to addition of the crosslinking agent during or after forming the fibers (sheet making). The addition may be effected by dipping the paper/nonwoven web into a solution of crosslinking agent, by coating the paper web with a solution of crosslinking agent or by spraying with a solution of crosslinking agent. Common coating and spraying devices are suitable for this purpose.

The paper/nonwoven is preferably dried before it is brought into contact with the solution of crosslinking agent. It is, however, also possible to bring the still moist sheet or the moist paper/nonwoven web into contact with the crosslinking agent.

In tissue making, the application of the metal-containing crosslinking agent (e.g. zirconium solution) preferably occurs in front of the TAD cylinder(s), between the TAD cylinders or behind the TAD cylinder(s) before the yankee cylinder. It is also conceivable to apply the metal-containing crosslinking agent to the yankee cylinder directly together with the coating or to treat the planiform fibrous material product with the crosslinking agent after creping.

Another preferred embodiment of the invention envisages the crosslinkage particularly of the cellulose-containing fibrous materials modified by oxidation of the hydroxyl group of the C6 atom of the glucose units of the cellulose into carbonyl groups within the pulp refinement of a paper machine, particulary a tissue paper machine, in that metals suitable for crosslinking, e.g. zirconium, are added, at a suitable point, to the mass in front of the headbox.

Another particularly preferred embodiment of the invention envisages the addition of a suitable crosslinking agent at a suitable point to the still moist paper web, particularly to the still moist raw tissue web, if it contains cellulosic fibrous materials suitable for crosslinkage, e.g. cellulosic fibrous materials modified by oxidation of the hydroxyl group of the C6 atom of the glucose units of the cellulose into carbonyl groups, particularly modified pulps, particularly if these modified cellulosic fibrous materials form part of at least one of the easily accessible outer sides of the still moist paper web, particularly the still moist raw tissue web.

In the TAD technique of tissue making, examples of suitable points of addition for the crosslinking agent are the freely accessible surface of the moist paper web after the so-called pickup, before or after so-called molding before the inflow to the first TAD cylinder or between two TAD cylinders. In conventional single-felt tissue production, for example, a suitable point of addition for the crosslinking agent is the moist raw tissue web adhering to the felt before the yankee cylinder, i.e. before the first press (suction pressure roll).

Another possible point of addition is the segment of the yankee cylinder between the first and the second press roll whenever the raw tissue web that still contains an increased residual moisture has already been delivered to the yankee cylinder and adheres to the surface of the yankee cylinder as a result of adhesive forces produced by the tissue's own adhesive agents or optionally by additional adhesive agents and/or release agents.

In accordance with further embodiments, the application of the optionally metallic crosslinking agent to the moist paper web can be effected for example by means of spray application using a spray bar fitted with nozzles or by means of roller application (e.g. a gravure printing roll with a chamber-type doctor blade or a flexographic printing unit), optionally by applying a contact pressure that is to be specified. The application may be distributed over the entire surface area, over a partial area or according to a random pattern that can be freely specified in order to achieve optimum strength, particularly wet strength of the raw tissue and the end product made therefrom.

According to two other preferred embodiments, the application of the crosslinking agent occurs over the surface of the already dry raw tissue paper, e.g. in TAD tissue production, at the outlet of the TAD section before the yankee cylinder or, in the case of TAD tissue production and conventional tissue production, the application occurs on the already creped paper web after the yankee cylinder.

A precondition in each case is that the potential needed for crosslinkage is present as a result of providing modified cellulosic raw fibrous materials accessible to crosslinkage in the moist or dry fibrous material web(s) to be treated, which means that e.g. the raw tissue web to be treated with crosslinker or the creped raw tissue contains crosslinkable modified raw fibrous materials.

Other preferred embodiments of the invention are constituted by the application of a crosslinker onto the dry paper web, particularly the dry, creped, optionally multi-ply raw tissue web within a doubling machine e.g. before a calender or by the application onto the raw tissue web that is also optionally multi-ply within a processing machine or onto the finished product that is again optionally multi-ply within a processing line before this end product is packaged if the aforementioned conditions are given, namely the presence of cellulosic fibrous materials that are suitable for crosslinkage and that have been modified, optionally modified by oxidation in accordance with the invention, and if such materials are accessible to the crosslinking agent.

The crosslinker can be applied in accordance with any of the approaches described above. If the crosslinker is applied after the actual production of the paper/tissue paper/ nonwoven, preferably during processing, this application may be effected in the form of freely definable patterns.

If there is a desire to confer antibacterial properties upon the cellulose-containing fibrous material, this material can be treated with an antibacterial agent at a suitable point in time, as is described in EP-A-905 289. A silver-based antibacterial agent is preferably used, e.g. silver zeolite, silver zirconium phosphate, silver calcium phosphate or silver-soluble glass. Silver zirconium phosphate can also be simultaneously used to crosslink the oxidized fibrous material. The treated fibrous material preferably contains the antimicrobial agent in an amount of 0.1 to 25.0 wt. %, particularly 0.1 to 0.5 wt. %, relative to the treated fibrous material (oven-dried). The treated fibrous material is suitable for example for the manufacture of medical products such as bandages, gauze, garments for surgical purposes or bed linen for hospital use.

The application of the modification in accordance with the invention by means of oxidation and crosslinkage is possible in numerous versions, a few of which will be illustrated below by way of example, without any claim to completeness.

> In principle, the modification of fibers in accordance with the invention, particularly the modification of the outer fiber surface, can be applied to any raw fibrous material that contains lignocellulose, particularly any natural vegetable raw fibrous materials. This is true inasmuch as these raw fibrous materials are suitable for example as raw material for the fiberboard industry, e.g. for the production of medium-density fiberboards, as a raw material for the paper industry for the production of paper, cardboard and board exhibiting a wide variety of basis weights according to the wet-laying techniques normally used for this purpose, particularly in the production of raw tissue or can be used for the production of nonwovens according to the wet-laying or various dry-laying techniques or in the production of fluff products, e.g. in hygiene products.

The invention is in principle suitable for application in a wide variety of industrial production sectors such as pulp production, paper and especially tissue paper production, paper and especially tissue processing, not to mention the production of nonwovens or quite different fields such as fiberboard production, particularly the production of medium-density fiberboards, without wishing to be restricted to these areas of application.

Besides starting and intermediate products, particularly planar intermediate products, the invention covers any finished products whose production entails the use of the aforementioned fibrous materials containing lignocellulose and modified by oxidation and crosslinkage either proportionally or on their own, optionally in combination with additives and/or auxiliary substances. The finished products for end-user consumption particularly include any categories of hygiene product—particularly any kinds of tissue product for hygiene requirements in the "consumer" sector and for "institutional" needs.

In a special embodiment of the invention, after oxidation of the hydroxyl group of the C6 atom of the glucose units of the cellulose into carbonyl groups and after metal crosslinkage, there are obtained flakes of fibers crosslinked together (fiber networks of an increased strength, particularly increased initial wet strength) and suitable as raw material for further processing into planar materials e.g. to manufacture paper and cardboard, particularly to make tissue paper and end products made therefrom, especially tissue products. These fiber flakes that can be regarded as miniature networks, may lend the products increased strength, particularly increased wet strength and dimensional stability.

In this embodiment, it is advantageous to apply special measures during sheet formation in order to ensure even distribution of the fiber flakes within the nonwoven and hence to guarantee even formation. Examples of this kind of measures include a dilution that is increased by up to two factors of ten as compared to the pulp density normal in the headbox when making paper, as is the case for example in the wet-laying techniques of nonwoven production, in order to ensure the mobility needed for the even distribution of the fiber flakes across the width of the pulp feed (headbox) over the revolving screen or screens and over time.

In paper production, for example, another possible way of ensuring the mobility of the micro-flakes is to add auxiliary chemical substances to the mass, preventing uncontrolled macroflocculation before sheet formation, optionally in conjunction with the production of an appropriate turbulence without simultaneously destroying the strength-boosting micro-flakes that were intentionally produced beforehand during pulp production. The aforementioned technical approaches must be understood as examples without in any way wishing to restrict the application of the invention.

These embodiments of the invention usually entail two versions,
(A) either providing the market with the (micro) fiber flakes as a product of separate pulp production in the form of a normal commercial product, e.g. dried in sheet form or in the form of bales, or
(B) in a preferred embodiment, supplying e.g. the paper making or tissue making stage with the (micro) fiber flakes in a state that has never been dried in a so-called integrated system in a suitable pulp density.

Such a fibrous material according to the invention (e.g. chemical pulp) may, in embodiment (A), exist as a special type of commercial pulp, dried e.g. in sheet form, stacked into bales or pressed into bales having been air-dried, optionally also flash-dried.

In embodiment (B), the modified fibrous material (e.g. a chemical pulp) is offered in undried form as a liquid pulp so that it is in readiness for example in a so-called pulp and paper or tissue plant directly as a starting product for paper and especially tissue paper production, optionally with subsequent processing. Availability as a liquid pulp is particularly advantageous because the properties' higher potential gained by the modification has an effect here without any losses, particularly the potential to improve physical properties, e.g. that of the initial wet strength of a planar material made of this modified fibrous material, such as the initial wet strength of a paper made thereof, particularly a tissue paper, whereas drying the fibrous material, e.g. as a result of further oxidation of the carbonyl groups into carboxyl groups, may entail losses which prevent the potential of properties from being completely exhausted.

Other versions according to the invention are brought about in that either different fibrous raw materials are modified or one and the same fibrous raw material is varyingly modified in separate refining steps integrated in parallel in a pulp refinement stage. Lastly, according to another embodiment, varyingly modified fibrous raw materials result in a product according to the invention if these varyingly modified fibrous raw materials are used in combination, for instance in that this mixture, by being supplied to a specific channel of a multi-layer headbox during sheet making, leads to a layered intermediate product or, optionally after further processing, leads to a layered final product.

The present invention will now be explained in more detail by means of examples, without excluding other applications.

EXAMPLES

Test Methods

The following test methods were used to evaluate the oxidized fibrous materials according to the invention as compared to fibrous materials which correspond, but which have not been modified by oxidation.

1) Producing the Test Sheets

The test sheets (having a basis weight of approx. 80 g/m$^2$) were made in accordance with the Rapid Köthen method (DIN 54 358-1, February 1981; see also ISO 5269-2:1980). Before being tested in terms of physical properties e.g. by means of the tensile test, the thus obtained test sheets were always conditioned for a duration of at least 12 hours in a standard climate at a temperature of $(23\pm1)$ ° C. and a relative humidity of $(50\pm2)\%$ in accordance with DIN EN 20187, Paper, Cardboard and Pulp, a standard climate for pretreatment and testing and a method of monitoring the climate and pretreatment of samples, November 1993 (see ISO 187:1990).

2) Initial Wet Strength (width-related breaking strength (wet)) and tear length (wet)

The wet strength according to DIN ISO 3781, Paper and Cardboard, tensile test, determination of the width-related breaking strength after immersion in water, October 1994 (identical to ISO 3781:1983), is herewith defined as initial wet strength of the fibrous material networks according to the invention, e.g. paper/tissue paper/nonwoven.

When experimentally checking the invention, the tensile test was accordingly performed by means of an electronic tensile test apparatus (Model 1122, Instron Corp., Canton, Mass., USA) with a constant rate of elongation of 10 mm/min using a Finch device. The width of the test strips was 15 mm. The strip length was about 180 mm. The free clamping length when using the Finch clamp was about 80 mm. The test strip was secured with both ends in a clamp of the test apparatus. The other end (loop) formed in this way was placed around a pin and treated at 20° C. with distilled water until complete saturation. The soaking period of the samples before tensile testing was fixed at 30 s. Six test strips at a time were measured, the result being indicated as an arithmetic mean.

To ensure that the wet strength of the samples has fully developed, which is particularly necessary in the case of samples in which additional wet-strength agents were used to boost wet strength, e.g. by their addition in the mass, the samples to be tested were always artificially aged before conducting the tensile test. Aging was effected by heating the samples in an air-circulating drying cabinet to $(125\pm1)$° C. for a period of 10 min.

A similar approach applies to paper/tissue paper/ nonwoven products, modified only to the extent that the test strips to be examined were taken from the finished product itself or from the product made thereof and that they do not originate from a laboratory test sheet.

As regards tissue paper and tissue products, DIN ISO 3781 is replaced by DIN EN 12625-5 Tissue Paper and Tissue Products-Part 5: determination of width-related wet load at break, January 1999. The strip width is then 50 mm, the free clamping length is shortened to about 50 mm, the depth of immersion of the loop formed by the test strip is at least 20 mm. The soaking duration (immersion time) is shortened to 15 s, the rate of elongation is set to a constant $(50\pm2)$ mm/min, the measurement of the breaking strength is performed on the sample immersed in distilled water.

Six test strips at a time were measured, the result being indicated as an arithmetic mean.

The tear length (wet) was calculated from the width-related breaking strength in accordance with the following formula (see TAPPI 494-96, Comment 9):

$$RL=102000(T/R)$$

where T is the initial wet strength in kN/m and

R is the basis weight in g/m²(in a standard climate)

3) Dry Strength (width-related breaking strength (dry)) and Tear Length (dry)

The dry strength was determined according to DIN EN ISO 1924-2, Paper and Cardboard, determination of properties under tensile load. Part 2: Method at a constant rate of elongation, April 1995, (ISO 1924-2:1994).

In the case of tissue paper and tissue products, the test is performed in accordance with DIN EN 12625-4, Tissue Paper and Tissue Products-Part 4: Determination of width-related breaking strength, elongation at break and tensile energy absorption, January 1999.

The tear length (dry) was calculated from the width-related breaking strength in accordance with the following formula (see TAPPI 494-96, Comment 9):

$$RL=102000(T/R)$$

where T is the tensile strength in kN/m and

R is the basis weight in g/m²(in a normal climate)

4) Relative Wet Strength

The relative wet strength (WS) was calculated as follows:

$$rel.\ WS=BS_{wet}/BS_{dry}$$

where $BS_{wet}$ is the width-related breaking strength of the wet sample strip and $BS_{dry}$ is the width-related breaking strength of the dry sample strip, and these values were ascertained in the manner described above.

5) Determination of the Carboxyl and Aldehyde Content

For the determination of the C(6)-carboxyl and/or -aldehyde contents in the cellulosic material of the invention, one of the following methods can be suitably adopted by a skilled person. In this context it should be noted that nitroxy-mediated, in particular TEMPO-mediated oxidations lead with a high selectivity to the oxidation of the C(6)-atom of the cellulosic glucose units to C(6)-aldehyde and/or C(6) carboxy groups. For this reason the methods 5.1. (conductometric) and 5.4. (hydroxylamine) can be applied which measure the total content of aldehyde and/or carboxy groups. The remaining methods 5.2. (uronic acid determination) and 5.3. (NMR) allow a specific distinction of C(6)-aldehyde and/or carboxy groups, even if other aldehyde and/or carboxy groups are present within the cellulose chain.

5.1.) The content of carboxyl groups in the fibers' cellulose chain can be detected by a conductometric titration and is calculated by converting the thus obtained charge value (into $\mu$mol/g).

The aldehyde content is obtained by performing a first conductometric titration with the oxidized cellulose to determine the carboxyl group content, selectively oxidizing the aldehyde groups into carboxyl groups as described below performing a second conductometric titration to detect the content of additionally formed carboxyl groups and deducting the charge values obtained in the first and second conductometric titrations from one another and converting them into $\mu$mol/g.

The weight data (g) refer to the fibrous material dried for 6 h at 105° C. (oven-dried).

The conductometric titration was performed by titration with sodium hydroxide after lowering the pH of the fiber suspension (pulp density <1%) using HCl (pulp density <1%) to about 3. At pH 3, an ion exchange is produced at the carboxylate functions so that the H- form is obtained. An optimum NaCl concentration ($0.2\times10^{-3}$ M) is used to suppress the Donnan equilibrium, i.e. to suppress the difference in pH between the fiber and the pH of the surrounding solution. During the titration, nitrogen gas is passed through the suspension to remove $O_2$ and $CO_2$ that disturb the titration. Both the changes in pH and the changes in conductivity are recorded during the titration. The length of the conductivity plateau is taken as a gauge for the amount of weak acids in the sample, and this plateau is calculated from the volume of sodium hydroxide solution in use and its concentration. The measuring method is performed at a temperature of 20° C.

A suitable method of performing the conductometric titration and determination of the COOH content is also described by S. Katz in "Svensk Papperstidning" 6/1984, p.48. S. Katz also describes the distinction between sulfonic acid groups and COOH groups in sulfite pulp.

The oxidation of the aldehyde groups into COOH groups was performed as follows. The pulp (1–2 g) was suspended in deionized water (100 ml) and the pH adjusted to 5 using HCL/NaOH. Before oxidation, a stoichiometric amount of $H_2O_2$ (relative to the estimated (see note below) amount of aldehyde functions, see below) is added in order to suppress any formation of chlorine during the reaction. One mol of aldehyde groups requires the addition of 1 mol $NaClO_2$, so that the aldehyde content should be estimated (see note below) at this time. The $NaClO_2$ consumption can nevertheless be monitored and an excess (approx. 10%) used. For those skilled in the art the reaction can be followed by the pH drop. The $NaClO_2$ is added in small portions while stirring the suspension, keeping the pH at 5 (temperature 20–25° C.). After the addition of $NaClO_2$, sodium hydroxide is optionally used to re-adjust the pH to pH 5 and the suspension is left to agitate over night. After drainage, the pulp can be used, as described above, for the conductometric measurement of the COOH content.

Note: If the estimate was wrong, a correction may become necessary. If the aldehyde content was estimated too high and therefore an excess of hydrogen peroxide was added, no correction is necessary. However, if the amount of aldehyde is estimated too low (recognizable by the fact that the reaction continues) an extra amount of hydrogen peroxide should be added followed by the corresponding amount of sodium chlorite. The continuation of the reaction is to be checked via the pH decrease. As long as the pH drops, more hydrogen peroxide and sodium chlorite is to be added. The necessary amounts of hydrogen peroxide and sodium chlorite correspond to each other on a 1:1 ratio (by mol).

5.2.) Another more selective method for determining the content of C(6)-aldehyde/carboxy groups in the fibrous material of the invention is the Blumenkrantz method (N. Blumenkrantz and G. Asboe-Hansen, Anal. Biochem. 1973, 54, 484). This method is based on the colorimetric determination of a pink compound arising when a decomposition product of the uronic acid polymer (C6-carboxy cellulose) reacts with 3-hydroxybiphenyl.

To a sample containing 1–20 µg oxidized fibrous material (dissolved in 0,2 ml water) 1.2 ml of a solution of 0,0125 M boric acid (e.g. obtainable from E. Merck, Germany)in conc. sulfuric acid (95–97%; e.g. obtainable from E. Merck, Germany) is added. The sample is heated in boiling water for 5 minutes, followed by cooling in ice (to room temperature or below). Then 20 µl of an aqueous solution of 0, 2% 3-hydroxybiphenyl e.g. obtainable from Aldrich) is added. After 15 minutes incubation the extinction is measured ($\lambda$=520 µm). D-glucuronic acid or its lactone (both e.g. obtainable from Aldrich) is used as reference material.

If the sample to be analyzed turns out to be poorly soluble in water (generally at a low degree of oxidation), the above method is modified by dissolving the sample in 90% sulfuric acid/boric acid mixture obtained by adding 10 vol. % water to 90 vol. % of a solution of 750 mg boric acid in 11 conc. sulfuric acid (E. Merck, as above). From this sulfuric acid/boric acid solution of the fibrous material 0.2 ml are taken and added to 0.2 ml water. To this mixture 1.0 ml of a solution of 0.0125 M boric acid in conc. sulfuric acid (E. Merck, as above) is added. Then the procedure is continued as above.). Also in this case D-glucuronic acid or its used as reference material.

The aldehyde content can be determined, by
Determining the content of uronic acid groups before an after the oxidation of C (6)-aldehyde groups to C(6)-carboxy groups (uronic acids) with chlorite and hydrogen peroxide, and
Subtracting these values.

5.3.) An alternative for the determination of C(6)-aldehyde contents involves the conversion of the oxidized material with hydroxylamine hydrochloride to the oxim. The C(6) oxim displays a distinct signal in $^{13}C$ NMR spectra.

5.4.) A further option for determining the aldehyde content involves the hydroxylamine method:
to a sample of 25 ml water containing 1 g of aldehyde-containing fibres, 0.20 g hydroxylammonium chloride (e.g. obtainable from E. Merck, Germany) was added which results in a gradual decrease of the pH value. The reaction mixture is heated for at least 3 hours at 40° C. The amount of HCl released was then titrated with 0.1 M NaOH (Titrisol, obtainable from Merck, Germany) up to end point of pH 3,4 and the consumed NaOH recalculated to µmol aldehyde/g fibres.

6) WRV (water retention value)
The WRV is determined in the following way.
The principle of determining the WRV is based on centrifuging swollen pulp samples at room temperature in a special-plupose centrifuge bealker with 3000-fold gravitational acceleration. The WRV in percent (mass portions in percent) indicates the portion of water in the sample that cannot be centrifuged.

Implementation conformed with German Zellcheming Code of Practice IV/33/57 (issued on Jan. 1, 1957)
A fibrous material treated with excess water as a swelling agent is taken.
The tubes for the centrifuge inserts are filled to about ⅔ of the volume with the moist pulp sample without pressing firmly.
A triple determination is to be performed each time.
The tubes are inserted into the centrifuge beaker.
Centrifuging conditions: 15 min at 4800 rpm
After the centrifuge comes to a standstill, the tubes are taken out and the centrifuged substance immediately transferred with the aid of pincers as completely as possible into the weighing bottles previously dried at 103° C. and tared at room temperature where they are weighed (remove glass spheres beforehand).
The samples are now dried for at least 6 hours in the circulating-air drying cabinet, immediately seal when taking them out and allow them to cool in the desiccator.
Now reweigh.
The calculation is made on the basis of the following equation:

$$WRV = \frac{(W-D)}{D} \times 100$$

where W=the weight of the moist substance, D represents the dry weight of the substance; and W minus D=the weight of the absorbed water.

7Other Parameters
Other test methods were performed in accordance with German DIN standards or in conformity therewith. In those cases in which there was deviation from the standardized test method, this is described.

DIN EN 20638 Pulp: determination of the dry-solids content (ISO 638: 1978); German version EN 20638:1993

DIN EN 25264-3 Pulp: laboratory beating-Part 3: Jokro mill method (ISO 5264-3 1979) German version EN 25264-3: 1994

DIN EN 25651 Paper, cardboard and pulps: measurement units for designation of properties (ISO 5651:1989); German version EN 25651:1993

DIN ISO 5267-1 Chemical pulp and mechanical pulp; examination of the dehydration behavior; Schopper-Riegler method; identical to ISO 5267-1: 1979

DIN 54357 Examination of pulp, determination of the kappa number

Example 1

A bleached kraft pulp (BSWK; Grapho Celeste, SCA, Östrand, (SE), kappa number 2.3; whiteness 89% ISO) was treated at a pulp density of approx. 25% with 0.25 wt. % ozone, relative to oven-dried fibrous material, at a temperature of 20° C. As described above, test sheets in conformity with the standards were then made. After drying, different quantities of a 10 wt. % aqueous ammonium zirconium carbonate (AZC) solution were evenly sprayed on to the test sheets at room temperature (25° C.) and the sheets again dried.

The amounts of ammonium zirconium carbonate solution in use are shown in the table (as wt. %, relative to the dry weight of the sheet).

TABLE 1

| No. | $O_3$ [wt. %] | AZC [wt. %] | Basis weight [g/m²] | Dry load at break [N/15 mm] | Wet load at break [N/15 mm] | Tear length dry [m] | Tear length wet [m] | Rel. WS [%] |
|---|---|---|---|---|---|---|---|---|
| No. 0 | — | — | 79.9 | 23.9 | 0.2 | 2033 | 17 | 0.8 |
| No. 1 | 0.25 | 0.45 | 76.8 | 23.8 | 1.3 | 2107 | 117 | 5.5 |
| No. 2 | 0.25 | 0.61 | 80.6 | 27.8 | 1.5 | 2345 | 125 | 5.3 |
| No. 3 | 0.25 | 0.32 | 77.7 | 22.4 | 1.1 | 1959 | 94 | 4.8 |
| No. 4 | 0.25 | 1.33 | 79.3 | 25.2 | 1.6 | 2160 | 135 | 6.3 |
| No. 5 | 0.25 | 0.47 | 79.3 | 23.6 | 1.3 | 2022 | 109 | 5.4 |
| No. 6 | 0.25 | 0.63 | 81.2 | 27.8 | 1.3 | 2326 | 110 | 4.7 |
| No. 7 | 0.25 | 1.38 | 82.5 | 30.6 | 2.2 | 2525 | 180 | 7.1 |
| No. 8 | 0.25 | 0.96 | 81.2 | 27.5 | 1.7 | 2301 | 145 | 6.3 |

It can be gathered from the values listed in the table that by using an amount of just 1.38% ammonium zirconium carbonate, a relative wet strength of 7.1% was already achieved. The relative wet strength approximately amounts to 9% relative to the untreated pulp.

Example 2

In this applicational example, part of a bleached hardwood sulfite pulp was beaten for 5 min.

Samples of not beaten and beaten pulp were treated with sodium hypochlorite in the presence of 4-OH-TEMPO in an aqueous suspension at a consistency of 1.5% at pH 3.0 (room temperature, duration of reaction: 3 h). The pulp pretreated in this manner was then washed.

As described above, test sheets in conformity with the standards were then each made from the pulp on a sheet former. Before drying, an aqueous 2% (wt. %) ammonium zirconium carbonate solution was sprayed on to the still moist sheets.

The oxidation conditions of the bleached softwood sulfite pulp and the quantities of ammonium zirconium carbonate solution used are listed in Table 2. The time indicated refers to the duration of oxidation.

TABLE 2

| No. | Time [min] | 4-hydroxy TEMPO [%] | 4-hydroxy TEMPO [g] | NaOCl [%] | NaOCl [ml] | 2n HCl [ml] | AZC not beaten [g] | AZC beaten [g] |
|---|---|---|---|---|---|---|---|---|
| No. 9 | 1 h | 1.5 | 0.75 | 5.0 | 19 | 55 | 3.0 | 3.5 |
| No. 10 | 1 h | 2.0 | 1 | 5.0 | 19 | 55 | 3.3 | 2.9 |
| No. 11 | 3 h | 1.0 | 0.5 | 5.0 | 19 | 55 | 3.0 | 3.1 |
| No. 12 | 3 h | 1.5 | 0.75 | 5.0 | 19 | 55 | 3.3 | 3.6 |
| No. 13 | 3 h | 2.0 | 1 | 5.0 | 19 | 55 | 2.8 | 3.8 |

NB: the percentages are wt. % relative to the pulp used (oven-dried)

The sheet was then dried and the tensile strengths of the test sheets were ascertained. The strength properties of the test sheets from the various series of tests are listed in Tables 3 to 6. The effects of treatment with AZC are listed in Tables 4 and 6. The corresponding comparative values, without addition of AZC, are shown in Tables 3 and 5.

TABLE 3

Fibrous material without addition of AZC

| Test series not beaten | Breaking strength dry [N/15 mm] | Tear length dry [m] | Breaking strength wet [N/15 mm] | Tear length wet [m] | Rel. wet strength [%] |
|---|---|---|---|---|---|
| Reference | 18.48 | 1285.7 | 0.151 | 10.5 | 0.8 |
| No. 9 | 27.19 | 2270.9 | 4.602 | 384.4 | 16.9 |
| No. 10 | 23.94 | 1980.1 | 4.687 | 387.7 | 19.6 |
| No. 11 | 29.38 | 2393.0 | 3.379 | 275.2 | 11.5 |
| No. 12 | 26.53 | 2200.1 | 4.127 | 342.2 | 15.6 |
| No. 13 | 24.70 | 2254.5 | 3.974 | 362.7 | 16.1 |

TABLE 4

Fibrous material with addition of AZC

| Test series not beaten | Breaking strength dry [N/15 mm] | Tear length dry [m] | Breaking strength wet [N/15 mm] | Tear length wet [m] | Rel. wet strength [%] |
|---|---|---|---|---|---|
| Reference | 20.25 | 1451.0 | 0.933 | 66.8 | 4.6 |
| No. 9 | 29.40 | 2413.8 | 7.737 | 635.2 | 26.3 |
| No. 10 | 31.64 | 2582.1 | 8.502 | 693.8 | 26.9 |
| No. 11 | 33.98 | 2770.4 | 5.775 | 470.8 | 17.0 |
| No. 12 | 34.23 | 2791.4 | 7.813 | 637.1 | 22.8 |
| Na. 13 | 34.18 | 3054.1 | 8.272 | 739.1 | 24.2 |

TABLE 5

Fibrous material after beating without addition of AZC

| Test series beaten | Breaking strength dry [N/15 mm] | Tear length dry [m] | Breaking strength wet [N/15 mm] | Tear length wet [m] | Rel. wet strength [%] |
|---|---|---|---|---|---|
| Reference | 60.82 | 5137.7 | 0.612 | 51.7 | 1.0 |
| No. 9 | 57.63 | 4815.7 | 7.628 | 637.4 | 13.2 |
| No. 10 | 46.99 | 3948.9 | 7.594 | 638.2 | 16.2 |
| No. 11 | 56.20 | 4742.0 | 5.963 | 503.1 | 10.6 |

TABLE 5-continued

Fibrous material after beating without addition of AZC

| Test series beaten | Breaking strength dry [N/15 mm] | Tear length dry [m] | Breaking strength wet [N/15 mm] | Tear length wet [m] | Rel. wet strength [%] |
|---|---|---|---|---|---|
| No. 12 | 52.03 | 4339.1 | 6.320 | 527.1 | 12.1 |
| No. 13 | 58.56 | 4989.1 | 8.580 | 731.0 | 14.7 |

TABLE 6

Fibrous material after beating and addition of AZC

| Test series beaten | Breaking strength dry [N/15 mm] | Tear length dry [m] | Breaking strength wet [N/15 mm] | Tear length wet [m] | Rel. wet strength [%] |
|---|---|---|---|---|---|
| Reference | 59.65 | 5106.1 | 1.756 | 150.3 | 2.9 |
| No. 9 | 57.06 | 4805.5 | 9.987 | 841.1 | 17.5 |
| No. 10 | 58.18 | 4809.3 | 11.670 | 964.7 | 20.1 |
| No. 11 | 59.96 | 5028.1 | 9.427 | 790.5 | 15.7 |
| No. 12 | 59.45 | 4932.6 | 9.146 | 758.8 | 15.4 |
| No. 13 | 59.45 | 4932.6 | 11.310 | 938.4 | 19.0 |

A clear increase in both dry strengths and wet strengths is surprisingly shown upon addition of the AZC solution. In this way, 24% tear length achieved in the dry state can still be obtained in the moist state.

Compared to the reference (untreated pulp), the examples show a significant rise in strength values as soon as the ammonium zirconium compound is sprayed on.

What is claimed is:

1. A crosslinked cellulose-containing fibrous material, wherein hydroxy groups are oxidized at the C(6) of glucose units of the cellulose into aldehyde and/or carboxy groups crosslinked with a metal-containing crosslinking agent selected from transition metals of groups IVa, Va, VIa, VIIa and VIIIa, aluminum and zinc.

2. A cellulose-containing fibrous material according to claim 1, wherein the total content of aldehyde and/or carboxy groups is at least 50 $\mu$mol/g fibrous material (as a dry content based on DIN EN 20638).

3. A cellulose-containing fibrous material according to claim 1, wherein the metal is zirconium or aluminum.

4. A cellulose-containing fibrous material according to claim 1, wherein the surfaces of the fibrous material used for oxidation are activated.

5. A paper or nonwoven comprising said cellulose-containing fibrous material according to claim 1.

6. A paper or nonwoven according to claim 5, wherein said paper or nonwoven is a tissue paper.

7. A paper or nonwoven according to claim 1, wherein said paper or nonwoven exhibits a tear length in the wet state of more than 400 m.

8. A paper or nonwoven according to claim 5, wherein said paper or nonwoven exhibits a relative wet strength of at least 5%.

9. A paper or nonwoven product comprising at least one ply of said paper or nonwoven according to claim 5.

10. A paper or nonwoven product according to claim 9, wherein said paper or nonwoven product is a tissue product.

11. A tissue product according to claim 9, said tissue product having the form of a cleaning wipe, sanitary product, paper handkerchief, household towel, towel, facial, napkin/serviette, bed linen or a garment.

12. A method of producing said crosslinked cellulose-containing fibrous material according to claims 1, comprising the steps of:

(A) oxidizing OH groups at the C(6) of glucose units of the celluose in said cellulose-containing fibrous material using an oxidizing agent into aldehyde and/or carboxy groups; and (B) crosslinking the oxidized fibers using a metal-containing crosslinking agent, the metal being selected from transition metals of groups IVa, Va, VIa, VIIa and VIIIa, zinc and aluminum.

13. A method according to claim 12, wherein said oxidizing agent is a nitroxy compound, optionally in combination with a primary oxidizing agent.

14. A method according claim 13, wherein said primary oxidizing agent is selected from ozone, hypochlorite, hypobromite, peracids, oxidizing metal compounds or oxidases.

15. A method according to claim 13, wherein said nitroxy compound is a sterically shielded, organic non-conjugated nitroxy compound.

16. A method according to claim 13, wherein said nitroxy compound is a 2,2,6,6-tetramethylpiperidinyl-1-oxyl (TEMPO) optionally substituted in 4 position.

17. A method according to claim 12, wherein said crosslinking agent is a zirconium salt or an aluminum salt.

18. A method according to claim 17, wherein said zirconium salt is ammonium zirconium carbonate (AZC).

19. A method according to claim 12, wherein said cellulose-containing fibrous material is brought into contact with a solution of said crosslinking agent after oxidation in the dry state or in the still moist wet state.

20. A method according to claim 19, wherein contact is established by spraying with the solution of crosslinking agent.

21. A method according to claim 19, wherein said fibrous material is formed into a paper or nonwoven before being sprayed with the solution of crosslinking agent.

22. A method of producing a paper or nonwoven according to claim 5, comprising the steps of oxidizing OH groups at the C(6) of glucose units of the cellulose in said cellulose-containing fibrous material using an oxidizing agent into aldehyde and/or carboxy groups;

wet laying said oxidized fibrous material;

pressing said wet-laid fibrous material;

drying said pressed fibrous material; and crosslinking said oxidized fibrous material with a metal-containing crosslinking agent before or after the drying step, said metal being selected from transition metals of the groups IVa, Va, VIa, VIIa and VIIIa, aluminum and zinc.

23. A method according to claim 22, wherein said paper is a tissue paper, and said method comprises a pre-drying step based on TAD technology which is followed by a creping step.

24. A method according to claim 22, wherein said paper is a tissue paper, and said method comprises a wet rush transfer step prior to the drying step.

25. A method according to claim 22, wherein said obtained tissue paper is further processed into a paper or nonwoven product using at least one process step chosen from: cutting to size, producing a plurality of plies, producing mechanical ply adhesion, volumetric and/or structural embossing, application of adhesive, folding, imprinting, perforating, application of lotions, calendering, stacking, rolling up.

* * * * *